US012626697B2

(12) United States Patent
Srinivasa et al.

(10) Patent No.: US 12,626,697 B2
(45) Date of Patent: May 12, 2026

(54) SYSTEM AND METHOD FOR KEYWORD FALSE ALARM REDUCTION

(71) Applicant: Samsung Electronics Co., Ltd., Suwon-si (KR)

(72) Inventors: Rakshith Sharma Srinivasa, Sunnyvale, CA (US); Yashas Malur Saidutta, Menlo Park, CA (US); Ching-Hua Lee, Mountain View, CA (US); Chou-Chang Yang, San Jose, CA (US); Yilin Shen, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/352,601

(22) Filed: Jul. 14, 2023

(65) Prior Publication Data

US 2024/0185850 A1     Jun. 6, 2024

Related U.S. Application Data

(60) Provisional application No. 63/419,268, filed on Oct. 25, 2022.

(51) Int. Cl.
    G10L 15/22       (2006.01)
    G10L 15/02       (2006.01)
    (Continued)
(52) U.S. Cl.
    CPC .............. G10L 15/22 (2013.01); G10L 15/02 (2013.01); G10L 15/063 (2013.01); G10L 15/18 (2013.01);
    (Continued)

(58) Field of Classification Search
    CPC ....... G10L 15/22; G10L 15/02; G10L 15/063; G10L 15/18; G10L 25/78;
    (Continued)

(56) References Cited

U.S. PATENT DOCUMENTS 10,304,440 B1 * 5/2019 Panchapagesan ....... G10L 15/08
10,872,599 B1 12/2020 Wu et al.
(Continued)

FOREIGN PATENT DOCUMENTS

WO     2021030918 A1     2/2021
WO     2023044836 A1     3/2023

OTHER PUBLICATIONS

Ming Sun, et al., "Max-Pooling Loss Training of Long Short-Term Memory Networks for Small-Footprint Keyword Spotting," 2016 IEEE Spoken Language Technology Workshop (SLT), San Diego, California, Dec. 13-16, 2016, pp. 474-480.
(Continued)

*Primary Examiner* — Michael Colucci

(57) ABSTRACT

A method includes extracting, using a keyword detection model, audio features from audio data. The method also includes processing the audio features by a first layer of the keyword detection model configured to predict a first likelihood that the audio data includes speech. The method also includes processing the audio features by a second layer of the keyword detection model configured to predict a second likelihood that the audio data includes keyword-like speech. The method also includes processing the audio features by a third layer of the keyword detection model configured to predict a third likelihood, for each of a plurality of possible keywords, that the audio data includes the keyword. The method also includes identifying a keyword included in the
(Continued)

audio data. The method also includes generating instructions to perform an action based at least in part on the identified keyword.

20 Claims, 16 Drawing Sheets

(51) Int. Cl.
| | |
|---|---|
| *G10L 15/06* | (2013.01) |
| *G10L 15/08* | (2006.01) |
| *G10L 15/18* | (2013.01) |
| *G10L 25/78* | (2013.01) |

(52) U.S. Cl.
CPC ........ *G10L 25/78* (2013.01); *G10L 2015/088* (2013.01); *G10L 2015/223* (2013.01)

(58) Field of Classification Search
CPC ......... G10L 2015/088; G10L 2015/223; G10L 15/32; G10L 15/08
See application file for complete search history.

(56) References Cited

U.S. PATENT DOCUMENTS

| | | | |
|---|---|---|---|
| 11,222,623 | B2 | 1/2022 | Wang et al. |
| 11,264,036 | B2 | 3/2022 | Kang et al. |
| 11,556,793 | B2 | 1/2023 | Gruenstein |
| 11,823,669 | B2 * | 11/2023 | Ding ........................ G10L 25/84 |
| 2015/0340032 | A1 * | 11/2015 | Gruenstein .............. G06N 3/08 |
| | | | 704/232 |
| 2017/0148429 | A1 | 5/2017 | Hayakawa |
| 2019/0318727 | A1 * | 10/2019 | Lopez Moreno ...... G06N 3/045 |
| 2020/0336846 | A1 * | 10/2020 | Rohde .................. H04R 25/554 |
| 2021/0055778 | A1 | 2/2021 | Myer et al. |
| 2022/0343895 | A1 | 10/2022 | Tomar et al. |
| 2023/0104431 | A1 | 4/2023 | Smyth et al. |

OTHER PUBLICATIONS

Sercan Ö. Arik, et al., "Convolutional Recurrent Neural Networks for Small-Footprint Keyword Spotting," Interspeech 2017, Acoustic Models for ASR 1, Stockholm, Sweden, Aug. 20-24, 2017, pp. 1606-1610.

Tara N. Sainath, et al., "Convolutional Neural Networks for Small-Footprint Keyword Spotting," Interspeech 2015, Fast Efficient and Scalable Computing for Neural Nets, Dresden, Germany, Sep. 6-10, 2015, pp. 1478-1482.

Raphael Tang, et al., "Deep Residual Learning for Small-Footprint Keyword Spotting," 2018 IEEE International Conference on Acoustics, Speech and Signal Processing (ICASSP), Calgary, Alberta, Canada, Apr. 15-20, 2018, pp. 5484-5488.

Seungwoo Choi, et al., "Temporal Convolution for Real-time Keyword Spotting on Mobile Devices" Interspeech 2019, Speech and Audio Classification 2, Graz, Austria, Sep. 15-19, 2019, pp. 3372-3376.

Ximin Li, et al., "Small-Footprint Keyword Spotting with Multi-Scale Temporal Convolution," Interspeech 2020, Speech Classification, Shanghai, China, Oct. 25-29, 2020, pp. 1987-1991.

Menglong Xu, et al. "Depthwise Separable Convolutional ResNet with Squeeze-and-Excitation Blocks for Small-footprint Keyword Spotting," Interspeech 2020, Spoken Term Detection, Shanghai, China, Oct. 25-29, 2020, pp. 2547-2551.

Byeonggeun Kim, et al., "Broadcasted Residual Learning for Efficient Keyword Spotting," arXiv:2106.04140, Jun. 8, 2021, 5 pages.

Mengjun Zeng, et al., "Effective Combination of DenseNet and BiLSTM for Keyword Spotting," IEEE Access, vol. 7, Jan. 10, 2019, pp. 10767-10775.

Oleg Rybakov, et al., "Streaming Keyword Spotting on Mobile Devices," Interspeech 2020, Applications of ASR, Shanghai, China, Oct. 25-29, 2020, pp. 2277-2281.

Axel Berg, et al., "Keyword Transformer: A Self-Attention Model for Keyword Spotting," Interspeech 2021, Spoken Term Detection & Voice Search, Brno, Czechia, Aug. 30-Sep. 3, 2021, pp. 4249-4253.

Ye Bai, et al., "A Time Delay Neural Network with Shared Weight Self-Attention for Small-Footprint Keyword Spotting," Interspeech 2019, Spoken Term Detection, Confidence Measure, and End-to-End Speech Recognition, Graz, Austria, Sep. 15-19, 2019, pp. 2190-2194.

Douglas Coimbra de Andrade, et al., "A neural attention model for speech command recognition," arXiv:1808.08929, Aug. 27, 2018, 18 pages.

Simon Mittermaier, et al. "Small-Footprint Keyword Spotting on Raw Audio Data with Sinc-Convolutions," ICASSP 2020—2020 IEEE International Conference on Acoustics, Speech and Signal Processing (ICASSP), Barcelona, Spain, May 4-8, 2020, pp. 7454-7458.

Bo Zhang, et al., "AutoKWS: Keyword Spotting with Differentiable Architecture Search," ICASSP 2021—2021 IEEE International Conference on Acoustics, Speech and Signal Processing (ICASSP), Toronto, Ontario, Canada, Jun. 6-11, 2021, pp. 2830-2834.

Tong Mo, et al., "Neural Architecture Search for Keyword Spotting," Interspeech 2020, Speech Classification, Shanghai, China, Oct. 25-29, 2020, pp. 1982-1986.

Bruno U. Pedroni, et al. "Small-footprint Spiking Neural Networks for Power-efficient Keyword Spotting," 2018 IEEE Biomedical Circuits and Systems Conference (BioCAS), Cleveland, Ohio, Oct. 17-19, 2018, 4 pages.

Samuel Myer, et al., "Efficient Keyword Spotting Using Time Delay Neural Networks," arXiv:1807.04353, Jul. 11, 2018, 5 pages.

Vineet Garg, et al., "Streaming Transformer for Hardware Efficient Voice Trigger Detection and False Trigger Mitigation," Interspeech 2021, Spoken Term Detection & Voice Search, Brno, Czechia, Aug. 30-Sep. 3, 2021, pp. 4209-4213.

Yiming Wang, et al., "Wake Word Detection with Alignment-Free Lattice-Free MMI," Interspeech 2020, Summarization, Semantic Analysis and Classification, Shanghai, China, Oct. 25-29, 2020, pp. 4258-4262.

International Search Report and Written Opinion of the International Searching Authority dated Jan. 24, 2024, in connection with International Application No. PCT/IB2023/060599, 7 pages.

* cited by examiner

300

301

302

Prior
Point of View

New Point of
View

303

Keyword Utterance

Non-Keyword Speech

Non-Speech Audio

1300

| Data \ Label | Label 1 | Label 2 | Label 3 |
|---|---|---|---|
| Keywords | Keyword label index | Keyword-like | Speech |
| Generic speech | N/A | Not keyword-like | Speech |
| Non-speech | N/A | N/A | Non-speech |

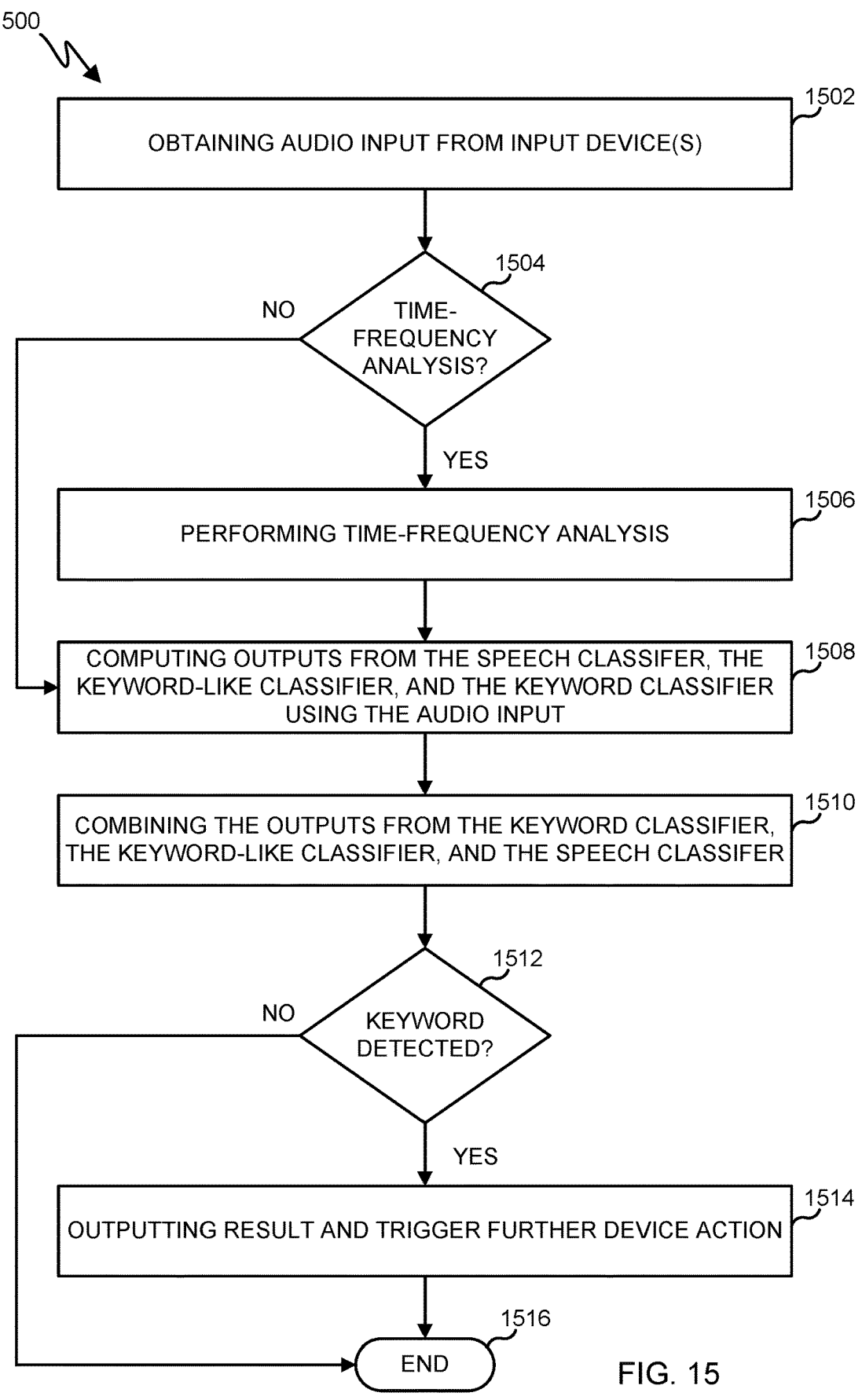

1500

1502
OBTAINING AUDIO INPUT FROM INPUT DEVICE(S)

1504
TIME-FREQUENCY ANALYSIS?

NO

YES

1506
PERFORMING TIME-FREQUENCY ANALYSIS

1508
COMPUTING OUTPUTS FROM THE SPEECH CLASSIFER, THE KEYWORD-LIKE CLASSIFIER, AND THE KEYWORD CLASSIFIER USING THE AUDIO INPUT

1510
COMBINING THE OUTPUTS FROM THE KEYWORD CLASSIFIER, THE KEYWORD-LIKE CLASSIFIER, AND THE SPEECH CLASSIFER

1512
KEYWORD DETECTED?

NO

YES

1514
OUTPUTTING RESULT AND TRIGGER FURTHER DEVICE ACTION

1516
END

FIG. 15

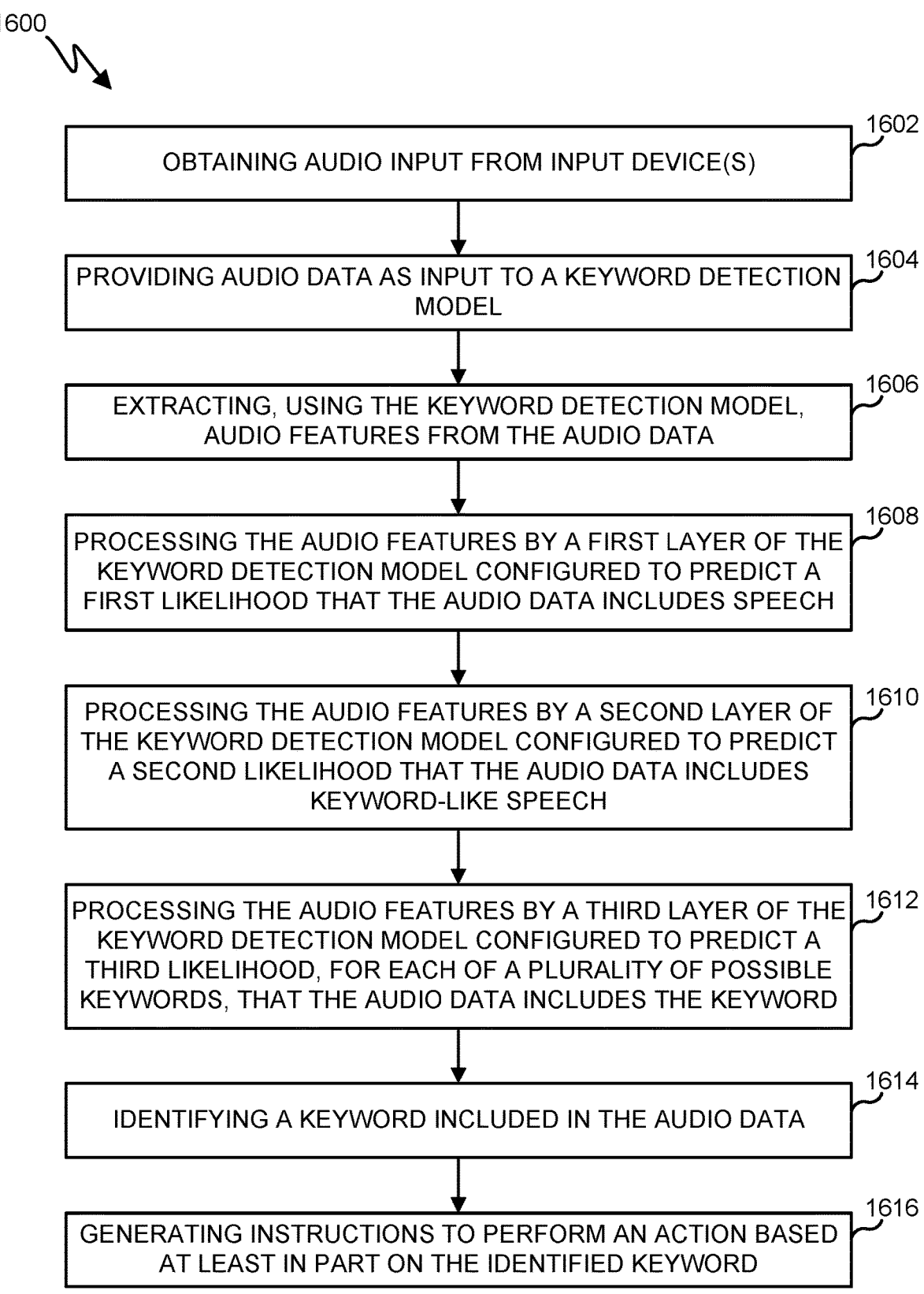

1600

1602
OBTAINING AUDIO INPUT FROM INPUT DEVICE(S)

1604
PROVIDING AUDIO DATA AS INPUT TO A KEYWORD DETECTION MODEL

1606
EXTRACTING, USING THE KEYWORD DETECTION MODEL, AUDIO FEATURES FROM THE AUDIO DATA

1608
PROCESSING THE AUDIO FEATURES BY A FIRST LAYER OF THE KEYWORD DETECTION MODEL CONFIGURED TO PREDICT A FIRST LIKELIHOOD THAT THE AUDIO DATA INCLUDES SPEECH

1610
PROCESSING THE AUDIO FEATURES BY A SECOND LAYER OF THE KEYWORD DETECTION MODEL CONFIGURED TO PREDICT A SECOND LIKELIHOOD THAT THE AUDIO DATA INCLUDES KEYWORD-LIKE SPEECH

1612
PROCESSING THE AUDIO FEATURES BY A THIRD LAYER OF THE KEYWORD DETECTION MODEL CONFIGURED TO PREDICT A THIRD LIKELIHOOD, FOR EACH OF A PLURALITY OF POSSIBLE KEYWORDS, THAT THE AUDIO DATA INCLUDES THE KEYWORD

1614
IDENTIFYING A KEYWORD INCLUDED IN THE AUDIO DATA

1616
GENERATING INSTRUCTIONS TO PERFORM AN ACTION BASED AT LEAST IN PART ON THE IDENTIFIED KEYWORD

FIG. 16

SYSTEM AND METHOD FOR KEYWORD FALSE ALARM REDUCTION

CROSS-REFERENCE TO RELATED APPLICATION AND PRIORITY CLAIM

This application claims priority under 35 U.S.C. § 119(e) to U.S. Provisional Patent Application No. 63,419,268 filed on Oct. 25, 2022, which is hereby incorporated by reference in its entirety.

TECHNICAL FIELD

This disclosure relates generally to machine learning systems. More specifically, this disclosure relates to a system and method for keyword false alarm reduction.

BACKGROUND

Voice-based interaction forms one of the fundamental ways in which people interact with smart devices. Such interactions can be controlled by "keywords," which are short words or phrases associated with specific follow-up actions. One example of a keyword is a wake-word, which is used to wake up a device from sleep mode. Keyword detection systems are used to continuously process incoming audio streams to detect these keywords. These systems generally need to have a low false alarm rate while maintaining a high detection rate. A high false alarm rate results in unnecessary triggering of downstream applications, leading to many undesirable outcomes including unintended recording and sharing of user audio, and wasteful device power consumption. This is especially exacerbated in real-world systems that often process "out-of-domain" audio on which they have not been trained.

SUMMARY

This disclosure relates to a system and method for keyword false alarm reduction.

In a first embodiment, a method includes obtaining audio data from an audio input device. The method also includes providing the audio data as input to a keyword detection model. The method also includes extracting, using the keyword detection model, audio features from the audio data. The method also includes processing the audio features by a first layer of the keyword detection model configured to predict a first likelihood that the audio data includes speech. The method also includes processing the audio features by a second layer of the keyword detection model configured to predict a second likelihood that the audio data includes keyword-like speech. The method also includes processing the audio features by a third layer of the keyword detection model configured to predict a third likelihood, for each of a plurality of possible keywords, that the audio data includes the keyword. The method also includes identifying a keyword included in the audio data. The method also includes generating instructions to perform an action based at least in part on the identified keyword.

In a second embodiment, an electronic device includes at least one processing device. The at least one processing device is configured to obtain audio data from an audio input device. The at least one processing device is also configured to provide the audio data as input to a keyword detection model. The at least one processing device is also configured to extract, using the keyword detection model, audio features from the audio data. The at least one processing device is also configured to process the audio features by a first layer of the keyword detection model configured to predict a first likelihood that the audio data includes speech. The at least one processing device is also configured to process the audio features by a second layer of the keyword detection model configured to predict a second likelihood that the audio data includes keyword-like speech. The at least one processing device is also configured to process the audio features by a third layer of the keyword detection model configured to predict a third likelihood, for each of a plurality of possible keywords, that the audio data includes the keyword. The at least one processing device is also configured to identify a keyword included in the audio data. The at least one processing device is also configured to generate instructions to perform an action based at least in part on the identified keyword.

In a third embodiment, a non-transitory machine readable medium contains instructions that when executed cause at least one processor of an electronic device to obtain audio data from an audio input device. The non-transitory machine readable medium also contains instructions that when executed cause the at least one processor to provide the audio data as input to a keyword detection model. The non-transitory machine readable medium also contains instructions that when executed cause the at least one processor to extract, using the keyword detection model, audio features from the audio data. The non-transitory machine readable medium also contains instructions that when executed cause the at least one processor to process the audio features by a first layer of the keyword detection model configured to predict a first likelihood that the audio data includes speech. The non-transitory machine readable medium also contains instructions that when executed cause the at least one processor to process the audio features by a second layer of the keyword detection model configured to predict a second likelihood that the audio data includes keyword-like speech. The non-transitory machine readable medium also contains instructions that when executed cause the at least one processor to process the audio features by a third layer of the keyword detection model configured to predict a third likelihood, for each of a plurality of possible keywords, that the audio data includes the keyword. The non-transitory machine readable medium also contains instructions that when executed cause the at least one processor to identify a keyword included in the audio data. The non-transitory machine readable medium also contains instructions that when executed cause the at least one processor to generate instructions to perform an action based at least in part on the identified keyword.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart minor, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 15 illustrates an example method for performing keyword detection in accordance with this disclosure; and FIG. 16 illustrates another example method for performing keyword detection in accordance with this disclosure.

DETAILED DESCRIPTION

Figure 1:
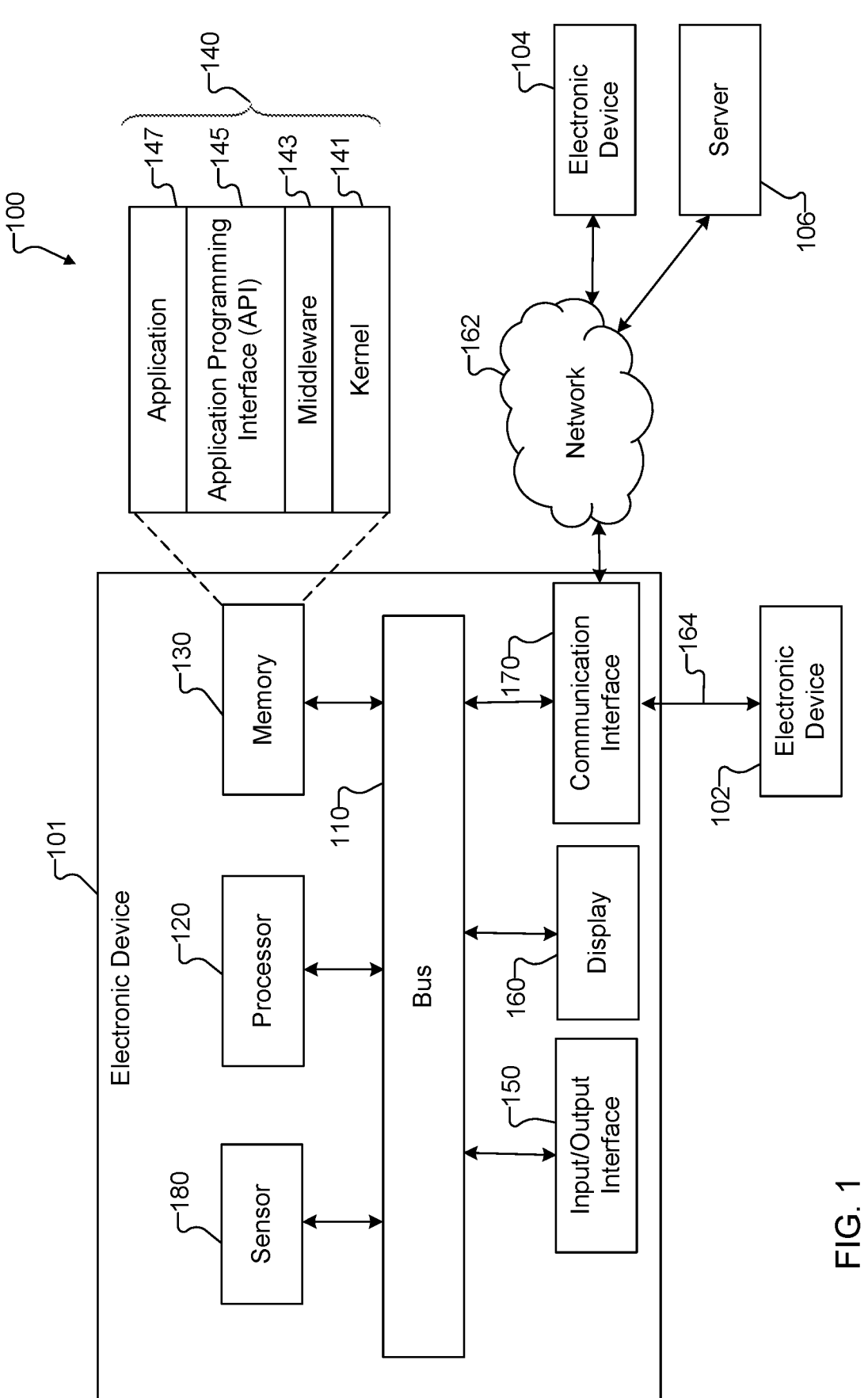
FIG. 1 illustrates an example network configuration including an electronic device in accordance with this disclosure.

FIGS. 1 through 16, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, voice-based interaction forms one of the fundamental ways in which people interact with smart devices. Such interactions can be controlled by "keywords," which are short words or phrases associated with specific follow-up actions. One example of a keyword is a wake-word, which is used to wake up a device from sleep mode. Keyword detection systems are used to continuously process incoming audio streams to detect these keywords. A majority of the time, though, keywords are not being uttered and the keyword detection system is thus processing what comprises non-keyword speech or non-speech (also referred to as noise). For instance, if an always-on keyword detection system has a false alarm rate of 5%, processing one second of audio every 0.1 second, this results in a false alarm count of 1800. Additionally, keyword detection systems, upon detecting a keyword, trigger other systems, like automated speech recognition (ASR) systems, that are present on the cloud, which can cause unnecessary sharing of an audio stream with a cloud server when the keyword detection system falsely detects a keyword, A high false alarm rate also results in unnecessary triggering of downstream on-device applications, leading to many undesirable outcomes including unintended recording and sharing of user audio, and wasteful device power consumption. This is especially exacerbated in real-world systems that often process "out-of-domain" audio on which they have not been trained, such as new types of background noise, and speakers with various voice characteristics.

Some existing solutions, including deep-learning based systems, are trained without specific emphasis on keeping the false alarm rate low or need post-keyword audio to reduce false alarms. A desirable quality in keyword detection systems is to have low power and computational resource requirements, since keyword detection systems typically operate in an "always-listening" mode. Small footprint keyword detection is a desired component of voice-based human-machine interfaces. Generally, machine learning based models tend to perform better as the model size and the number of parameters increase. There has been work to study variable-model-size designs that trade-off detection rate and model size. However, these models do not explicitly consider the effect of model size on false alarm rate and out-of-domain detection. A potential workaround to improve false alarm rate is to use much larger training datasets and larger model sizes, both of which are undesirable. Collecting larger training datasets is often infeasible and expensive, and training larger models makes it challenging to deploy them in low-resource environments. There is thus a need for methods of reducing false alarm rates without increasing power, memory, and computational requirements. Also, some existing approaches that target low false alarm rates as part of their system design use additional audio from the input stream after the keyword has been uttered. Approaches that use such post-utterance audio have various drawbacks, such as additional computational requirements for processing post-utterance audio, increased latency as a result of processing post-utterance audio, and privacy concerns due to recording and downstream processing of unnecessary audio.

This disclosure provides novel systems and methods that make efficient use of training data and follows a novel training protocol that reduces false alarm rates. During training, data is re-used for multiple related tasks, which leads to a maximum extraction of information from a given dataset without increasing the model size. This disclosure provides, in various embodiments, a keyword detection system with successive refinement that can include multiple layers which each perform a different classification with respect to an audio input, such as one layer to classify an audio input into a speech or non-speech class, another layer to classify the audio input into a keyword-like or non-keyword like class, and another layer to classify the audio input into a keyword class of a plurality of possible keyword classes. Additionally, the keyword detection system of this disclosure reduces false alarm rates without using post-utterance audio, avoiding the issues described above while also retaining a small model size.

The systems and methods of this disclosure make it possible to train keyword detection systems for keywords with minimal positive examples, achieved by pooling together data to create "super-classes" that can help learn models with higher discriminative power. This assists in achieving a substantial reduction in false alarm rate in deep models for keyword detection. The keyword detection systems of this disclosure are flexible and can be used in any chosen existing architecture for keyword detection, and incorporating the systems can result in a reduction of false alarm rates across various models. Surprisingly, it has been found that the keyword detection models and methods of this disclosure are as accurate as existing keyword detection models, false alarm rates are drastically reduced for both in-domain and out-of-domain data, and model size and number of computations are not increased even when employing the different classifiers described in this disclosure as part of a deployed keyword detection system. It has also been found that the keyword detection models and methods of this disclosure reduce false alarms by an even greater factor as larger numbers of keywords are used.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process inputs (such as audio inputs or data received from an audio input device like a microphone) and perform keyword detection and/or automated speech recognition tasks using the inputs. The processor 120 may also instruct other devices to perform certain operations (such as outputting audio using an audio output device like a speaker) or display content on one or more displays 160. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of audio data, recognizing or detecting keywords or phrases in utterances included in the audio data, performing speech recognition on the utterances, and executing tasks related to the content of the utterances. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs or data received from an audio input device like a microphone) and perform keyword detection and/or automated speech recognition tasks using the inputs. The server 106 may also instruct other devices to perform certain operations (such as outputting audio using an audio output device like a speaker) or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
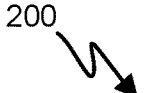
FIG. 2 illustrates an example keyword detection system in accordance with this disclosure.
Figure 2:
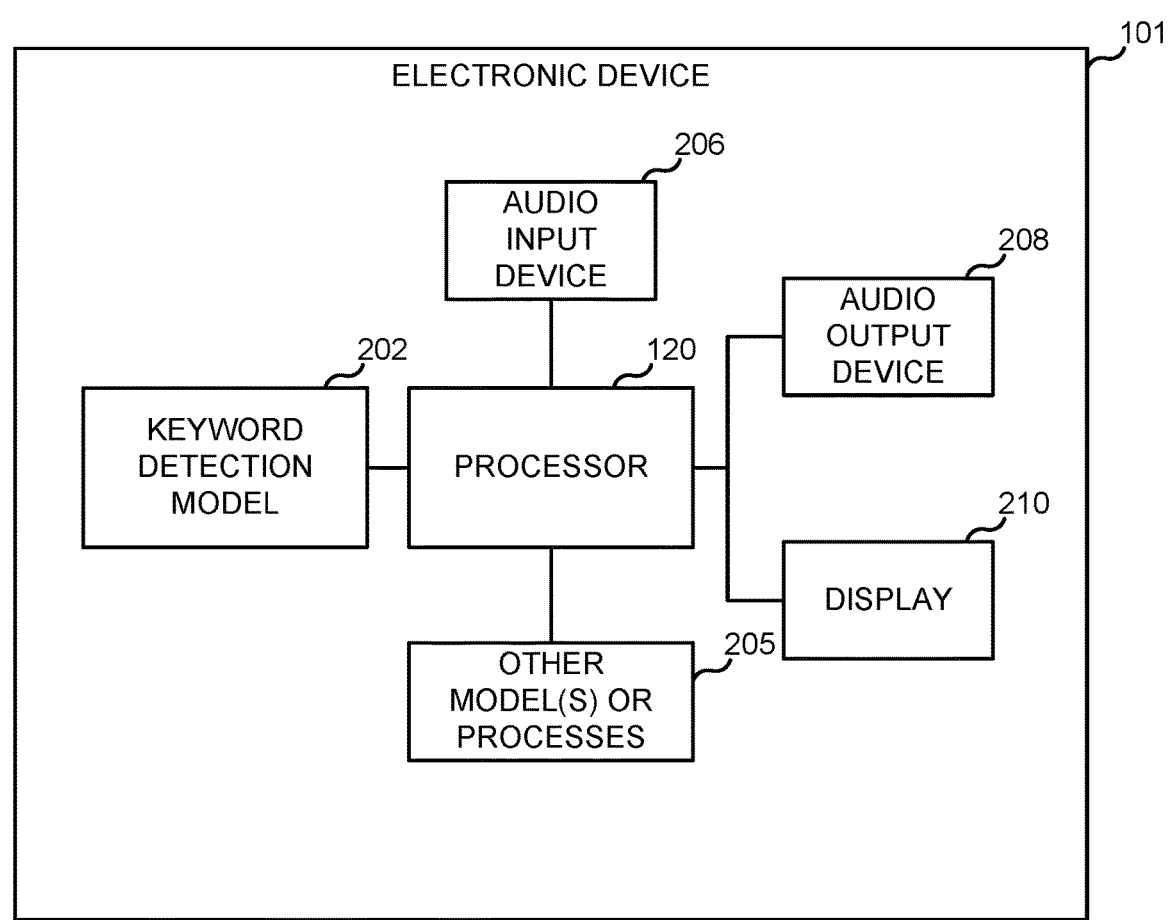

FIG. 2 illustrates an example keyword detection system 200 in accordance with this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models, such as one or more keyword detection models 202. The keyword detection model 202 can be trained to recognize one or more keywords or phrases. For example, keywords can include wake words or phrases (e.g., "hey GOOGLE" or "hey BIXBY"), which are used to wake up a voice assistant of an electronic device from a low power or sleep mode. Additionally or alternatively, the keyword detection model 202 can detect predetermined keywords or phrases other than wake words or phrases, such as specific device commands that serve to both wake up the voice assistant and trigger further action, such as a preset command to "call Mom," a preset command to play a song, a preset command to set a TV device to a particular setting or channel, a preset command to set an oven to a given temperature, and so on. The keyword detection model 202 acts as a gatekeeper to provide a lightweight solution for detecting if a keyword or phrase is even present in an utterance before committing additional resources to processing the utterance by the electronic device 101.

The processor 120 can also be operatively coupled to or otherwise configured to use one or more other models 205, such as one or more automated speech recognition (ASR) models, and/or one or more natural language understanding (NLU) models. Once the keyword detection model 202 successfully detects a keyword, these other models 205 can be utilized to further process commands provided by the user now that the voice assistant of the electronic device 101 has been activated/woken based on the successfully detected keyword. It will be understood that the machine learning models 202, 205 can be stored in a memory of the electronic device 101 (such as the memory 130) and accessed by the processor 120 to perform automated speech recognition tasks or other tasks. However, the machine learning models 202-205 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained keyword detection model 202. The trained keyword detection model 202 detects whether a keyword, such as a wake word or phrase, is included in an utterance within the audio data and outputs a result to the processor 120, such as one or more predictions that the utterance includes the keyword or phrase. If a keyword or phrase is detected, the processor 120 provides the audio data to the other models or processes 205 for further processing. Based on the further processing of the audio data by the other models or processes 205, the processor 120 can instruct at least one action of the electronic device 101 or of another device or system. For example, after a positive detection of a keyword or phrase and other actions such as performing ASR/NLU on the audio data containing an utterance, the processor 120 may instruct one or more further actions that correspond to one or more instructions or requests provided in the utterance.

In various embodiments, it will be understood that trained machine learning models such as the keyword detection model 202 can operate to detect whether a keyword or phrase is in an utterance. Based on that determination, the utterance may or may not be provided to another machine learning model (such as an automated speech recognition model) for further processing of the utterance in order to recognize the command being given by the user.

As a particular example, assume an utterance is received from a user via the audio input device 206 including a keyword or phrase (such as "hey BIXBY, call mom"). Here, the trained keyword detection model 202 detects the presence of the keyword "BIXBY" or phrase "hey, BIXBY," which causes the voice assistant features of the electronic device 101 to wake from a low power or sleep mode, and the processor 120 instructs the audio output device 208 to output "calling Mom." The processor 120 also causes a phone application or other communication application to begin a communication session with a "mom" contact stored on the electronic device 101 or otherwise in association with the user of the electronic device 101. As another particular example, suppose an utterance of "hey BIXBY, start a timer" is received. The trained keyword detection model 202 may detect the presence of the keyword "BIXBY" or phrase "hey, BIXBY," and the processor 120 may instruct execution of a timer application and display of a timer on the display 210 of the electronic device 101.

Although FIG. 2 illustrates one example of a keyword detection system 200, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the keyword detection model 202, as well as one or more of the other machine learning models 205, can be stored as separate models called upon by the processor 120 to perform certain tasks or can be included in and form a part of one or more larger machine learning models. In some embodiments, the keyword detection model 202 may be made up of a plurality of sub-models. Further, in some embodiments, one or more of the machine learning models, including the keyword detection model 202, can be stored remotely from the electronic device 101, such as on the server 106. Here, the electronic device 101 can transmit requests including inputs (such as captured audio data) to the server 106 for processing of the inputs using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3:
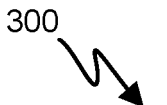
FIG. 3 illustrates an example comparison between prior keyword detection systems and the keyword detections systems of the embodiments of this disclosure.
Figure 3:
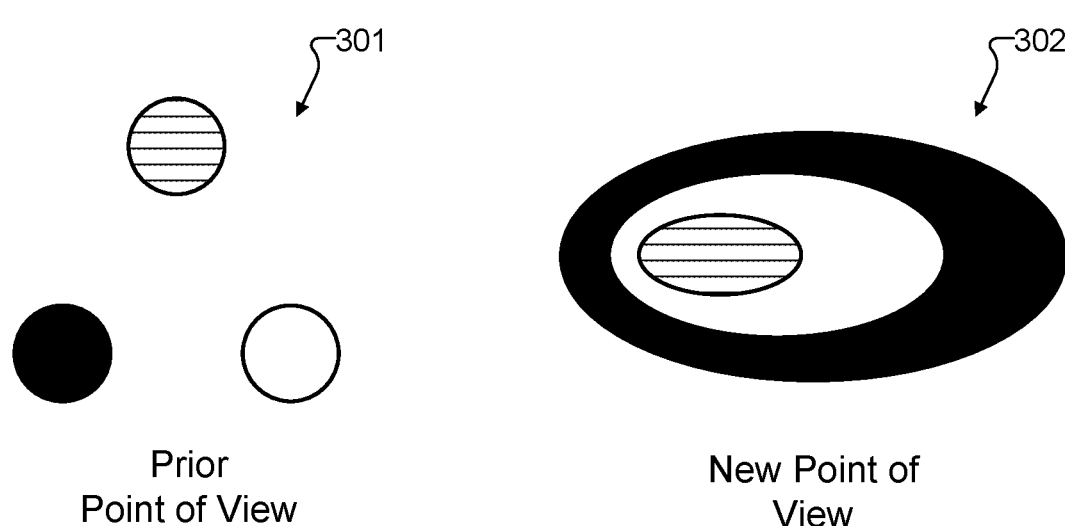
Figure 3:
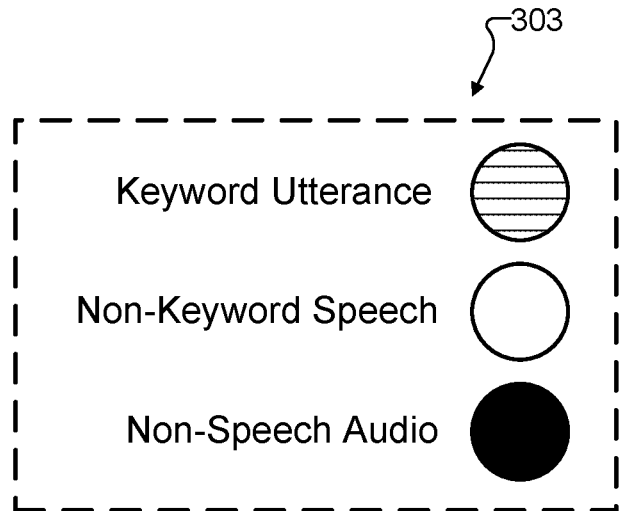

FIG. 3 illustrates an example comparison 300 between prior keyword detection systems and the keyword detections systems of the embodiments of this disclosure. This disclosure establishes a new paradigm for how keyword detection systems process audio data. Some methods employing deep keyword detections systems perform keyword spotting by treating non-keyword speech, non-speech, and keyword speech as mutually exclusive classes that are equally far apart from one another. FIG. 3 illustrates this prior pointof-view 301, using a single keyword system as an example, where each mutually exclusive class is treated as being equally distant from each other. However, in reality, the set of all audio speech forms a subset, and keywords form a subset within speech, as illustrated in the new point-of-view 302. Legend 303 indicates which portions of the points-of-views 301 and 302 refer to non-speech audio, non-keyword speech, and a keyword utterance. This new point-of-view 302 leverages the fact that keywords share more similarities with non-keyword speech, owing to the fact that they are both speech. Similarly, keywords spoken as stand-alone commands have a rise and fall in energy associated with the utterance, whereas general speech has a more stable energy profile. That is, these categories or classes have an inherent hierarchical structure such that all audio can be classified as speech or non-speech, and all speech audio can be classified as generic speech or keywords.

Figure 4:
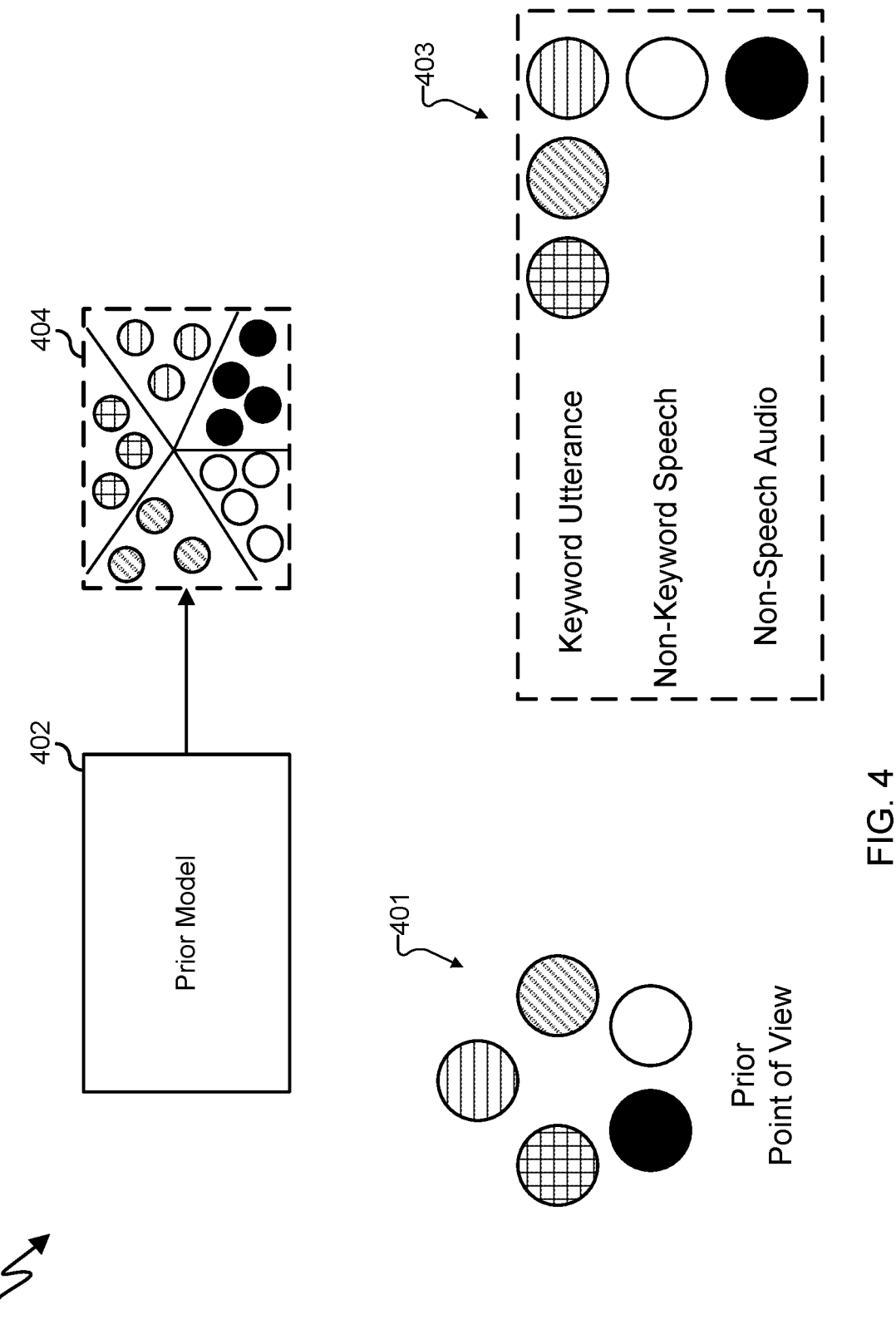
FIG. 4 illustrates an example prior model.

For example, FIG. 4 illustrates an example prior model 402. This prior model, based on a point-of-view 401 akin to the point-of-view 301, but with additional keywords in this example as shown in the legend 403, is not able to recognize the inherent hierarchical structure of audio data. Instead, as shown in diagram 404, this prior model 402 categorizes the different keywords, non-speech audio, and non-keyword speech into mutually exclusive classes.

But, as described above, these categories or classes have an inherent hierarchical structure in that all audio can be classified as speech or non-speech, and all speech audio can be classified as generic speech or keywords. This inherent hierarchical structure can thus be leveraged to design more robust keyword detection systems that have a low false alarm rate and generalize better to out-of-domain data.

Figure 5:
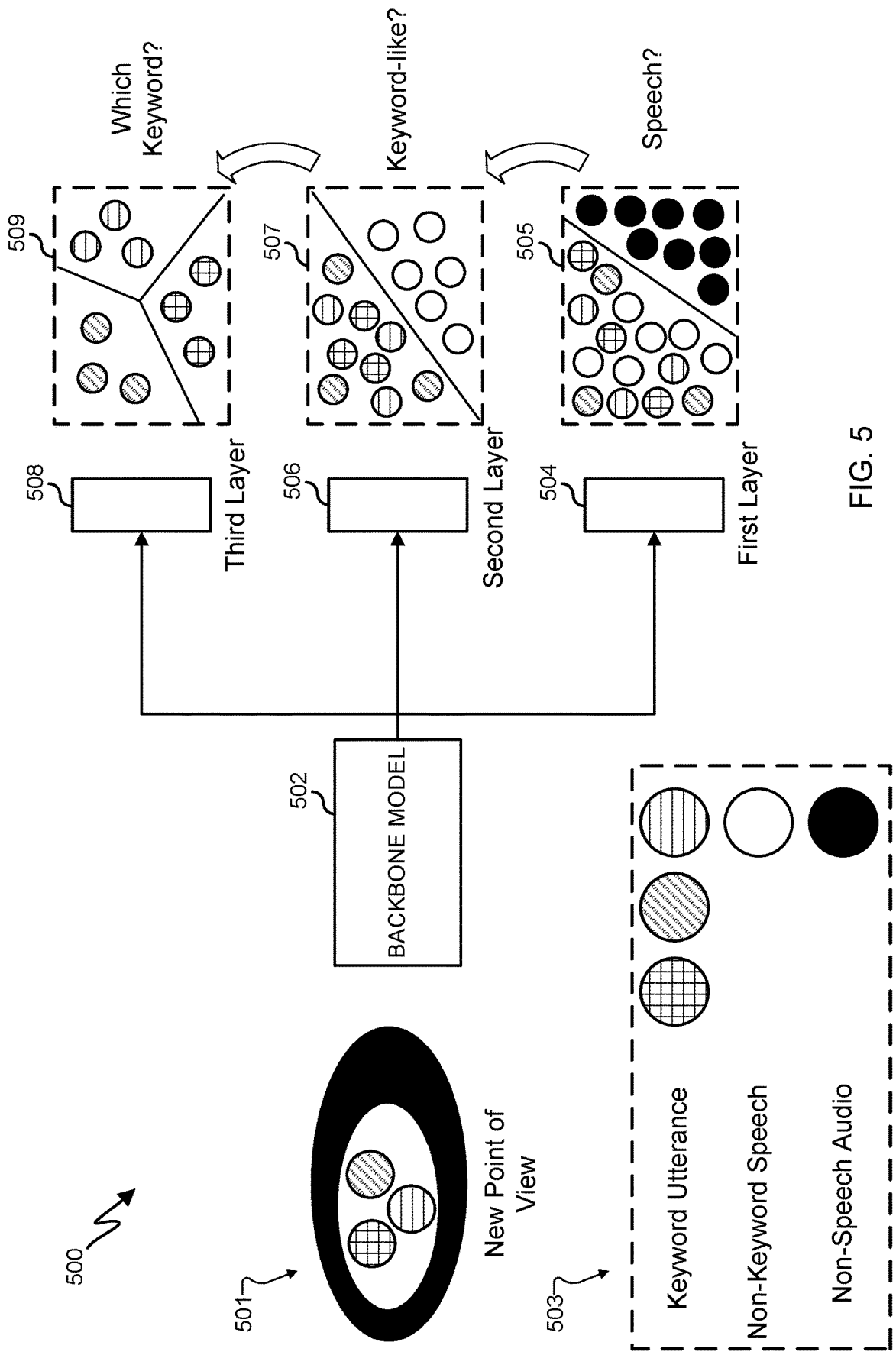
FIG. 5 illustrates an example keyword detection model architecture in accordance with this disclosure.

FIG. 5 illustrates an example keyword detection model architecture 500 in accordance with this disclosure. For ease of explanation, the architecture 500 shown in FIG. 5 is described as being implemented on or supported by the electronic device 101 in the network configuration 100 of FIG. 1. However, the architecture 500 shown in FIG. 5 could be used with any other suitable device(s) and in any other suitable system(s), such as when the architecture 500 is implemented on or supported by the server 106.

Based on the above-described insights regarding the inherent hierarchical structure of audio data, the example architecture 500 employs a successive refinement-based deep keyword detection and classifier model. Instead of employing three separate classifiers, in this example, the architecture 500 includes a backbone model 502 that receives the audio data and provides internal representations derived from the audio data that are reused for three different classification branches. The backbone model 502 reduces overall computations by analyzing common low level features such as energy levels of the audio data, instead of having each branch perform this function separately. That it, the backbone model 502 leverages the knowledge that low-level features for the three different branches can be common and higher level features can be specialized for a particular branch The architecture 500 includes three layers that act as classifiers using the internal representation derived from the audio data provided by the backbone model 502. These three classifier layers can act as the final layers of the model defined by the architecture 500.

As shown in FIG. 5, this successive refinement uses a branched architecture having three branches performing specialized tasks that aid in keyword classification. A first classifier 504 predicts whether the input audio frame includes speech or non-speech. A second classifier 506 predicts whether the input audio frame includes keyword-like speech or non-keyword-like speech. A third classifier predicts which keyword from one or more predetermined keywords was uttered. As opposed to prior approaches that use a single branch that attempts to directly detect the keyword, the architecture 500 provides a new point-of-view 501, as described above, in which the inherent hierarchical structure of audio data is leveraged to provide a richer learning signal where enhanced hierarchical supervision allows for learning models that can substantially reduce false alarms.

As shown by the point-of-view 501, and as shown in the legend 503, keywords are a subset of speech, which in turn is a subset of all audio. This if further illustrated in FIG. 5 by the diagrams 505, 507, 509. The diagram 505 illustrates how the first classifier 504 categorizes non-speech audio from speech-audio. As seen in the diagram 505, both non-keyword speech and keyword utterances are categorized into a same speech class. The diagram 507 illustrates how the second classifier 506 categorizes non-keyword like speech into one non-keyword speech class, and all keyword utterances, including utterances that include different keywords, into another keyword class. The diagram 509 illustrates how the third classifier 508 categorizes the different keyword utterances according to their respective keyword class. The keyword detection models as described in this disclosure thus perform a unique form of data pooling that creates sub-groups of audio data using the natural hierarchical structure present in audio data, which provides more data for each of the branches and thus enhanced generalization.

Although FIG. 5 illustrates one example of a keyword detection model architecture 500, various changes may be made to FIG. 5. For example, various components and functions in FIG. 5 may be combined, further subdivided, replicated, or rearranged according to particular needs. Also, one or more additional components and functions may be included if needed or desired.

Figure 6:
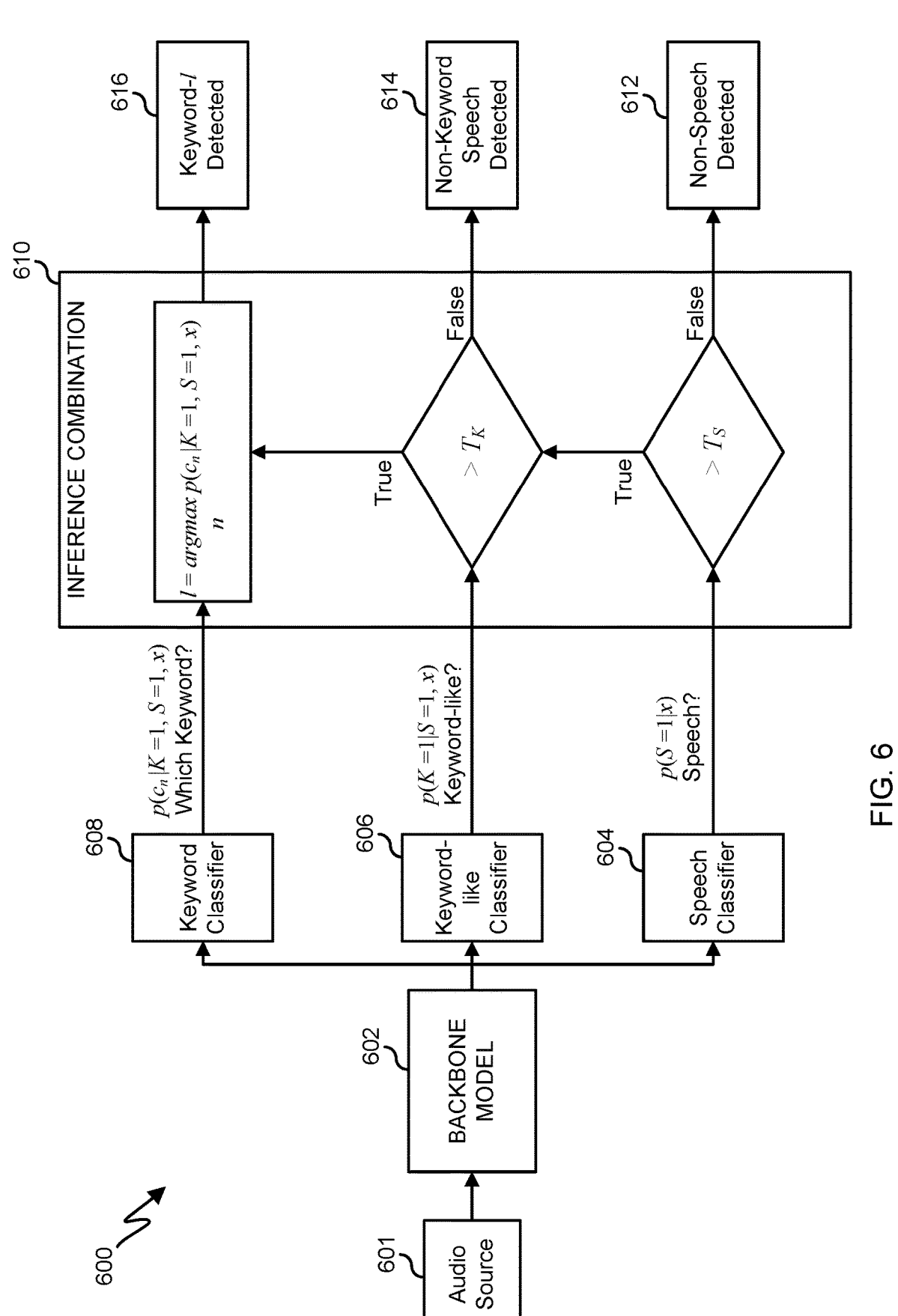
FIG. 6 illustrates another example keyword detection model architecture in accordance with this disclosure.

FIG. 6 illustrates another example keyword detection model architecture 600 in accordance with this disclosure. For ease of explanation, the architecture 600 shown in FIG. 6 is described as being implemented on or supported by the electronic device 101 in the network configuration 100 of FIG. 1. However, the architecture 600 shown in FIG. 6 could be used with any other suitable device(s) and in any other suitable system(s), such as when the architecture 600 is implemented on or supported by the server 106.

As also described with respect to FIG. 5, the architecture 600 includes a backbone model 602 and three classifier layers: a speech classifier 604, a keyword-like classifier 606, and a keyword classifier 608. The backbone model 602 receives audio data from an audio source 601 (e.g., at least one microphone of electronic device 101), and in turn provides internal representations of the audio data to the three classifiers. In this example, the labels for classification correspond to an N number of possible keywords, non-keyword speech, and non-speech. Prior systems and models would attempt to directly classify the input audio into one of these N+2 classes, but the architecture 600 classifies the audio data in a hierarchical fashion.

The architecture 600, as well as other embodiments of the keyword detection systems/models of this disclosure, utilize total probability and the hierarchical nature of the classes to reach final prediction or output. For example, let $p(c_n|x)$ represent the probability of input audio frame x including an utterance of keyword $c_n$, where $n \in \{1, 2, \ldots, N\}$. A random variable S can be defined to have a value of 1 when there is speech, and 0 when there is no speech. A random variable K can be defined to have a value of 1 when there is keyword-like speech, and 0 when there is no keyword-like speech. Then, the total probability that an audio input includes a keyword can be represented as follows:

$$p(c_n|x) = \Sigma_{K,S \in \{0,1\}} p(c_n|K, S, x)p(K|S,x)p(S|x) = p \\ (c_n|K=1, S=1, x)p(K=1|S=1, x)p(S=1|x) \quad (1)$$

where the first equality follows from the law of total probability, and the second equality follows from the hierarchical nature of the classes. That is, when the audio does not contain speech, it cannot contain keyword-like speech ($p(K=1|S=0, x)=0$), and when the audio does not include keyword-like speech, it cannot include a keyword ($p(c_n|K=0, S=1, x)=0$).

This is further illustrated in FIG. 6. In this example, the probability outputs of the speech classifier 604 and keyword-like classifier 606 are compared to thresholds and the classifiers are run sequentially, with their outputs being provided to an inference combination operation 610. The speech classifier 604 receives audio data from the backbone model 602 and classifies the audio data as including speech or non-speech. If the speech classifier 604 classifies the audio data as non-speech, the model provides an output 612 indicating that non-speech is detected. Responsive to the processor executing the inference combination operation 610 and determining the probability that speech is present in the audio data is above a first threshold ($>T_S$), the keyword-like classifier 606 receives audio data from the backbone model 602 and classifies the audio data as including keyword-like speech or non-keyword-like speech.

If the keyword-like classifier 606 classifies the audio data as non-keyword speech, the model provides an output 614 indicating that non-keyword speech is detected. Responsive to the processor executing the inference combination operation 610 and determining the probability that keyword-like speech is present in the audio data is above a second threshold ($>T_K$), the keyword classifier 608 receives audio data from the backbone model 602 and classifies which keyword was uttered in the audio data. The processor executing the inference combination operation 610 determines from the probabilities provided by the keyword classifier 608 which keyword has the highest probability, which can be represented as:

$$l = \underset{n}{\arg\max}\, p(c_n|K = 1, S = 1, x) \quad (2)$$

The model then provides an output 616 indicating which keyword was detected in the audio data. The output is then mapped onto the associated downstream task within the device to perform further actions based on one or more commands included in the utterance provided by the user. Since, in practical usage, the likelihood of encountering a keyword utterance is very small compared to non-speech or keyword-like speech, the selective branch activation of architecture 600 reduces overall computation, while also substantially reducing the number of false wake ups. The keyword detection models of this disclosure also reduce false alarms without sacrificing the overall accuracy or increasing the memory footprint or computation. This makes it a very flexible solution, because it can be used to improve small or large footprint models based on the device constraints.

Figure 7:
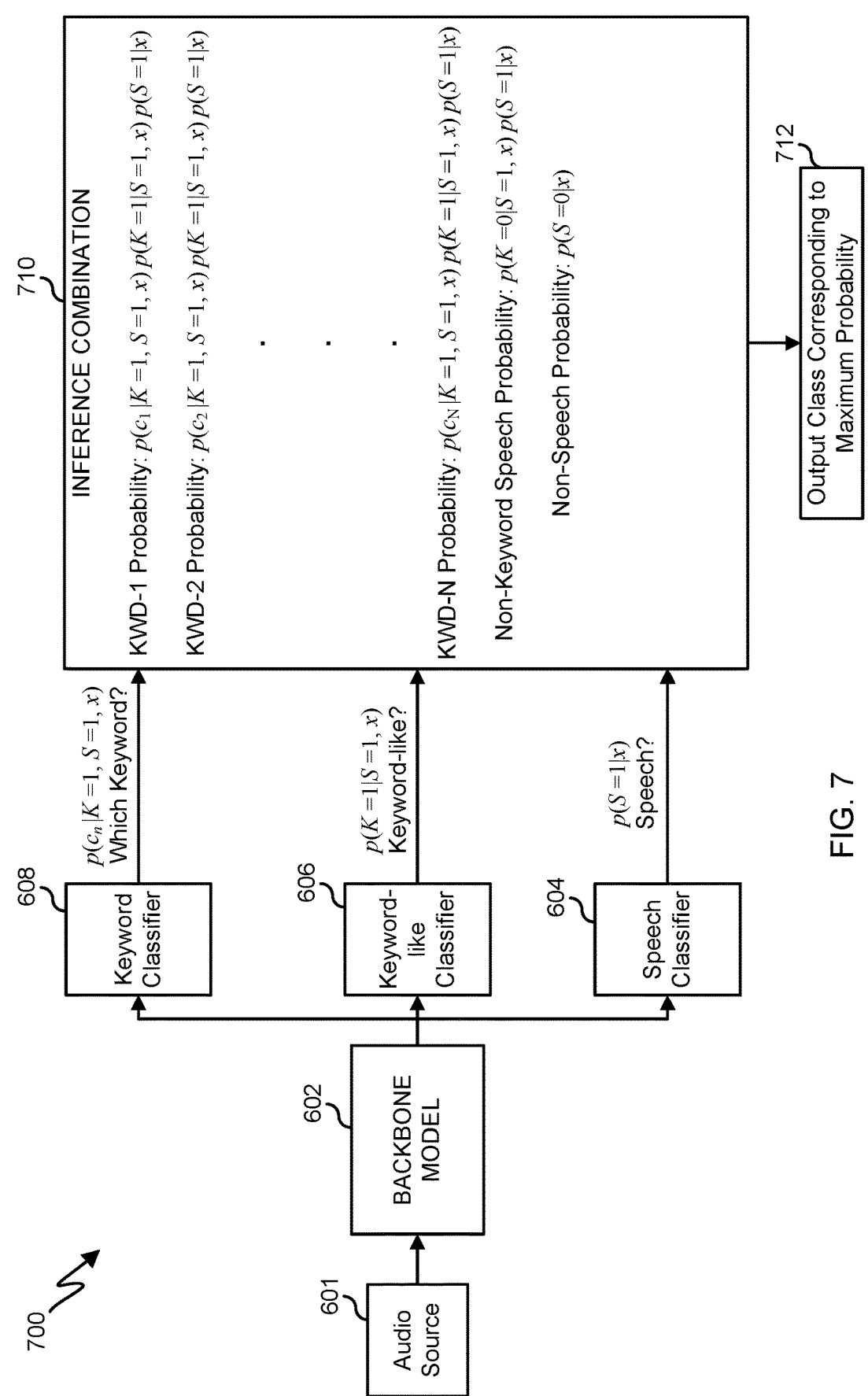
FIG. 7 illustrates another example keyword detection model architecture in accordance with this disclosure.

In various embodiments of this disclosure, the inference combination operation may function differently. For example, FIG. 7 illustrates another example keyword detection model architecture 700 in accordance with this disclosure. For ease of explanation, the architecture 700 shown in FIG. 7 is described as being implemented on or supported by the electronic device 101 in the network configuration 100 of FIG. 1. However, the architecture 700 shown in FIG. 7 could be used with any other suitable device(s) and in any other suitable system(s), such as when the architecture 700 is implemented on or supported by the server 106.

Unlike training as further detailed in this disclosure, during inferencing the audio input frame is sent through all three branches since it is unknown whether the audio data includes non-speech, non-keyword-like speech, or a keyword utterance. As illustrated in FIG. 7, in this example, rather than using thresholds, an inference combination operation 710 executed by the processor can receive the probabilities of each of the N+2 possibilities from each of the speech classifier 604, the keyword-like classifier 606, and the keyword classifier 608, leveraging the inherent hierarchical structure of audio data as identified by the classifiers. The inference combination operation 710 is used to select the possibility with the highest probability, and provide an output 712 corresponding to the class having the maximum probability.

Although FIGS. 6 and 7 illustrate examples of keyword detection model architectures 600 and 700, various changes may be made to FIGS. 6 and 7. For example, various components and functions in FIGS. 6 and 7 may be combined, further subdivided, replicated, or rearranged according to particular needs. Also, one or more additional components and functions may be included if needed or desired.

Figure 8:
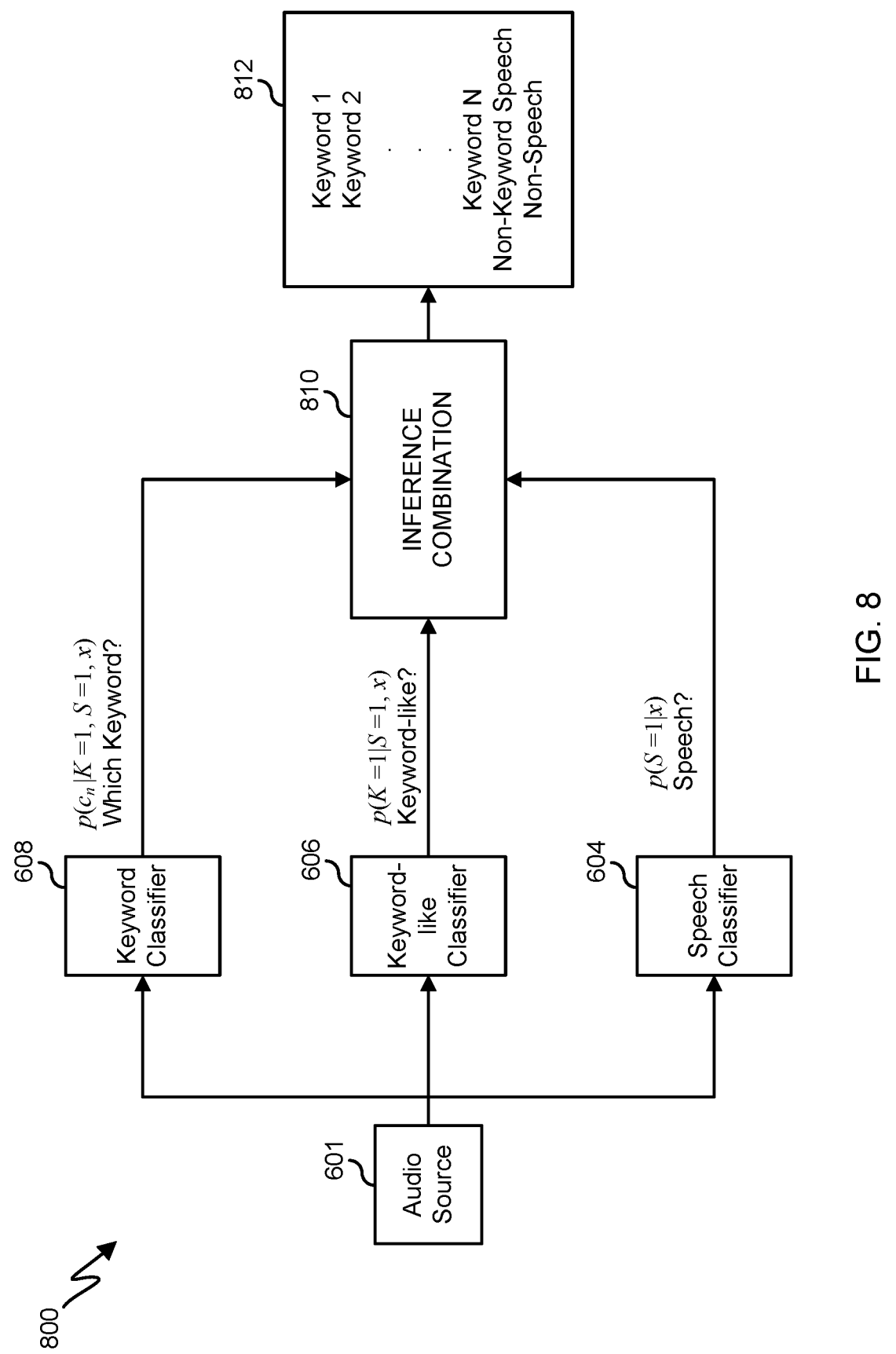
FIG. 8 illustrates an example keyword detection model architecture without a backbone model in accordance with this disclosure.

For example, FIG. 8 illustrates an example keyword detection model architecture 800 without a backbone model in accordance with this disclosure. For ease of explanation, the architecture 800 shown in FIG. 8 is described as being implemented on or supported by the electronic device 101 in the network configuration 100 of FIG. 1. However, the architecture 800 shown in FIG. 8 could be used with any other suitable device(s) and in any other suitable system(s), such as when the architecture 800 is implemented on or supported by the server 106.

As shown in FIG. 8, the architecture may not include backbone model that provides common layers for the three branches. In such a case, as illustrated in FIG. 8, the speech classifier 604, the keyword-like classifier 606, and the keyword classifier 608 are deployed as separate classifiers. Here, the exclusion of the backbone model may allow for deployment of the keyword detection model into particular environments in which a backbone model is not needed or desired. But the separate classifiers still leverage the inherent hierarchical nature of audio data, an inference combination operation 810 (such as one of the inference combination operation 610 or 710) is executed, and an output 812 corresponding to one of the N+2 possibilities is provided by the model, resulting in substantially fewer false alarms.

Although FIG. 8 illustrates one example of a keyword detection model architecture 800 without a backbone model, various changes may be made to FIG. 8. For example, various components and functions in FIG. 8 may be combined, further subdivided, replicated, or rearranged according to particular needs. Also, one or more additional components and functions may be included if needed or desired.

Figure 9:
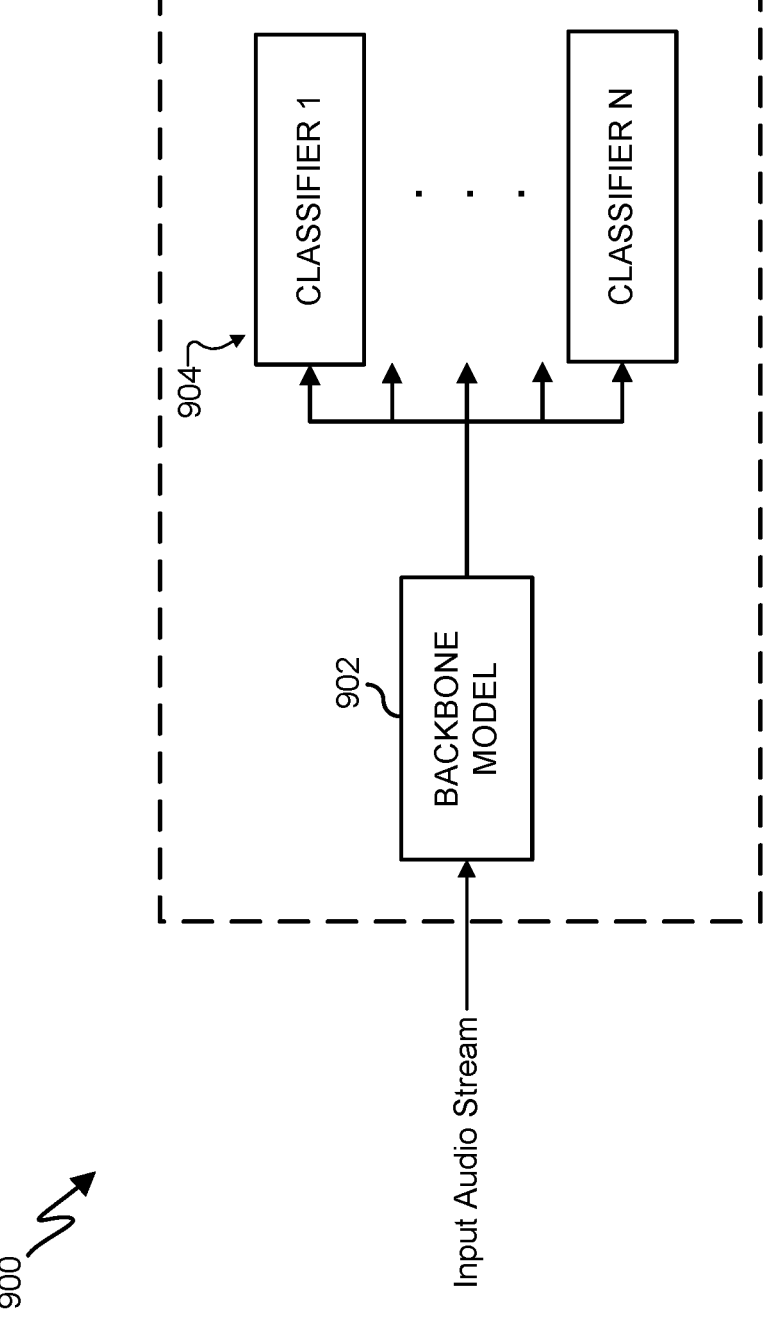
FIG. 9 illustrates an example subgroup classifier architecture in accordance with this disclosure.

As another example, FIG. 9 illustrates an example subgroup classifier architecture 900 in accordance with this disclosure. For ease of explanation, the architecture 900 shown in FIG. 9 is described as being implemented on or supported by the electronic device 101 in the network configuration 100 of FIG. 1. However, the architecture 900 shown in FIG. 9 could be used with any other suitable device(s) and in any other suitable system(s), such as when the architecture 900 is implemented on or supported by the server 106.

The branching architectures and associated training described in this disclosure can be used to account for other types of subgroups that may be present in training data. For example, depending on specific applications on the electronic device 101, the training data may have many layers of structure. For instance, a keyword detection system for a home device ecosystem with multiple devices such as a refrigerator, a TV, a washing machine, an oven, etc., may have groups of keywords corresponding to each device. Further, the devices themselves may be grouped into different categories. Thus, the branching architectures described in this disclosure can be adapted to include additional branching corresponding to the particular structure of the ecosystem.

FIG. 9 shows that a backbone model 902 receives an input audio stream, and then provides audio data to a plurality of classifiers 904. In this example, the architecture 900 can include a speech classifier (e.g., speech classifier 604) and a keyword-like classifier (e.g., keyword-like classifier 606). But where there are separate sets of keywords for different devices, such as a different set of keywords for a TV device and a different set of keywords for a refrigerator device, additional keyword classifiers can be used. In this way, keywords for each device can be pooled, and each keyword classifier can be trained to recognize keywords for a specific device, that is, that specific category of keywords.

Although FIG. 9 illustrates one example of a subgroup classifier architecture 900, various changes may be made to FIG. 9. For example, various components and functions in FIG. 9 may be combined, further subdivided, replicated, or rearranged according to particular needs. Also, one or more additional components and functions may be included if needed or desired.

Figure 10:
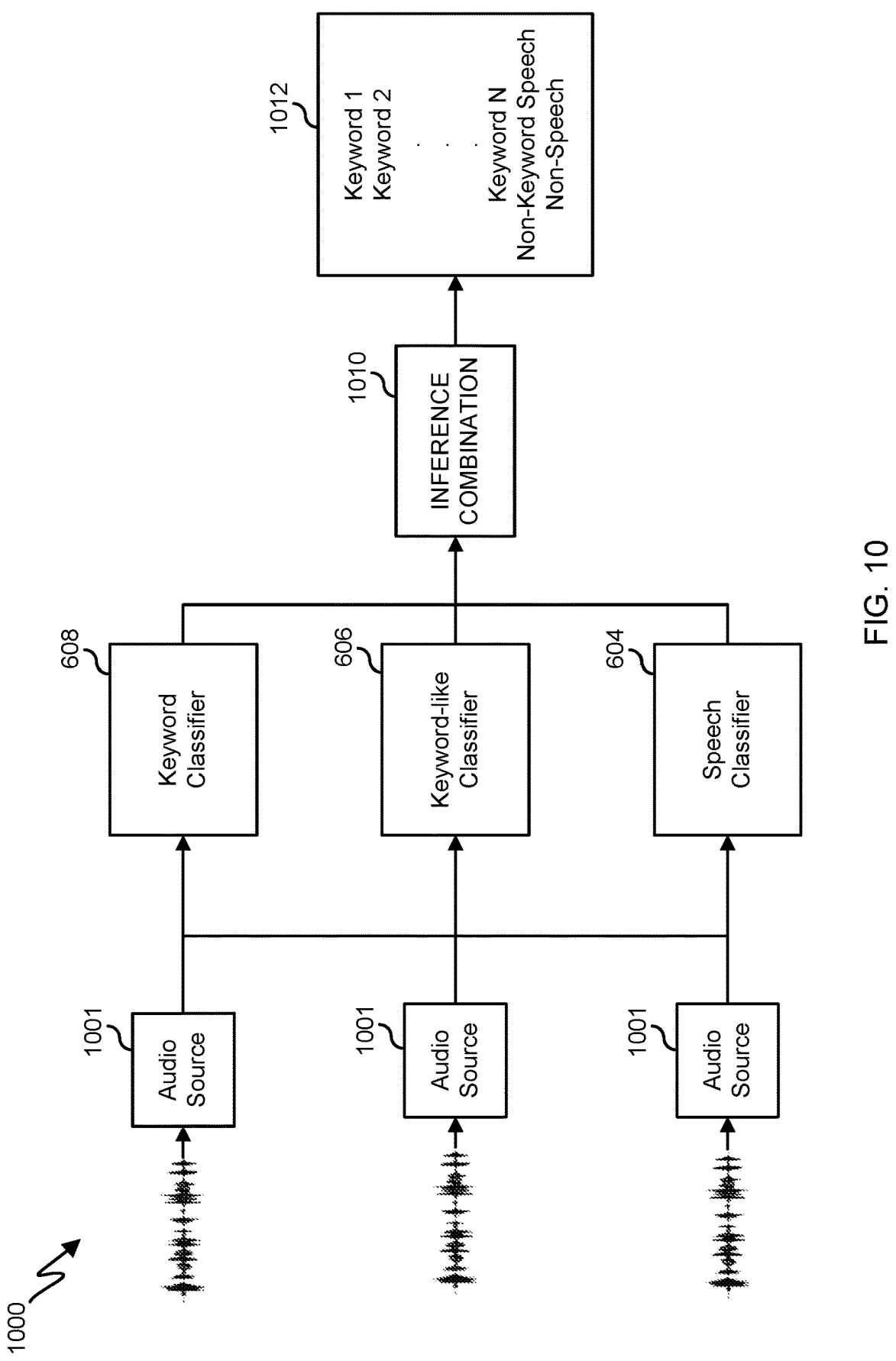
FIG. 10 illustrates an example keyword detection model architecture with multiple audio sources in accordance with this disclosure.

As yet another example, FIG. 10 illustrates an example keyword detection model architecture 1000 with multiple audio sources in accordance with this disclosure. For ease of explanation, the architecture 1000 shown in FIG. 10 is described as being implemented on or supported by the electronic device 101 in the network configuration 100 of FIG. 1. However, the architecture 1000 shown in FIG. 10 could be used with any other suitable device(s) and in any other suitable system(s), such as when the architecture 1000 is implemented on or supported by the server 106.

As shown in FIG. 10, multiple audio sources 1001 (e.g., audio input devices of the electronic device 101 such as microphones) can be used to source audio data, and the information received from the multiple audio sources 1001 can be directly passed to the successive refinement based keyword detection model, that is, directly to each classifier. The use of multiple audio sources can enhance the performance of the keyword detection model, such as by providing increased noise detection or recognizing other acoustic features of the audio data. The classifiers leverage the inherent hierarchical nature of audio data, an inference combination operation 1010 (such as one of the inference combination operation 610 or 710) is executed, and an output 1012 corresponding to one of the N+2 possibilities is provided by the model, resulting in substantially fewer false alarms.

Figure 11:
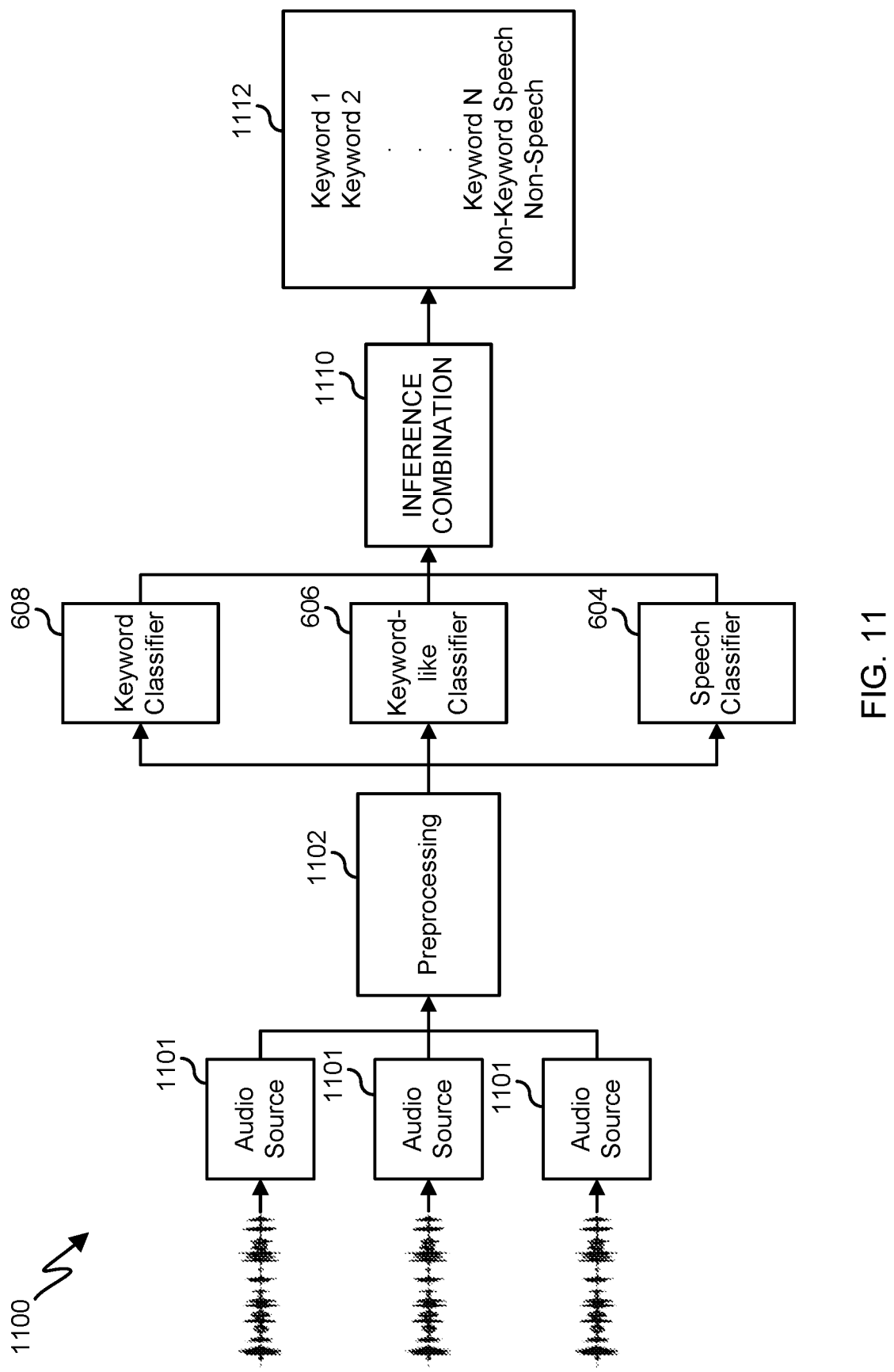
FIG. 11 illustrates an example keyword detection model architecture with multiple audio sources and a preprocessing operation in accordance with this disclosure.

In some cases, a preprocessing operation can be performed on the audio inputs received from the multiple audio sources. For example, FIG. 11 illustrates an example keyword detection model architecture 1100 with multiple audio sources and a preprocessing operation 1102 in accordance with this disclosure. For ease of explanation, the architecture 1100 shown in FIG. 11 is described as being implemented on or supported by the electronic device 101 in the network configuration 100 of FIG. 1. However, the architecture 1100 shown in FIG. 11 could be used with any other suitable device(s) and in any other suitable system(s), such as when the architecture 1100 is implemented on or supported by the server 106.

As shown in FIG. 11, the architecture 1100 includes multiple audio sources 1101 (e.g., audio input devices of the electronic device 101 such as microphones) used to source audio data. The information received from the multiple audio sources 1101 is provided to the preprocessing operation 1102. This can include the processor executing the preprocessing operation 1102 before passing the processed signals to the successive refinement based keyword detection model. The preprocessing operation 1102 can be used to perform beam-forming, denoising, or other operations on the plurality of input audio data received from the multiple audio sources 1101. The classifiers 604, 606, 608 leverage the inherent hierarchical nature of audio data, an inference combination operation 1110 (such as one of the inference combination operation 610 or 710) is executed, and an output 1112 corresponding to one of the N+2 possibilities is provided by the model, resulting in substantially fewer false alarms.

Although FIGS. 10 and 11 illustrate examples of keyword detection model architectures 1000 and 1100 with multiple audio sources, various changes may be made to FIGS. 10 and 11. For example, various components and functions in FIGS. 10 and 11 may be combined, further subdivided, replicated, or rearranged according to particular needs. Also, one or more additional components and functions may be included if needed or desired.

Figure 12:
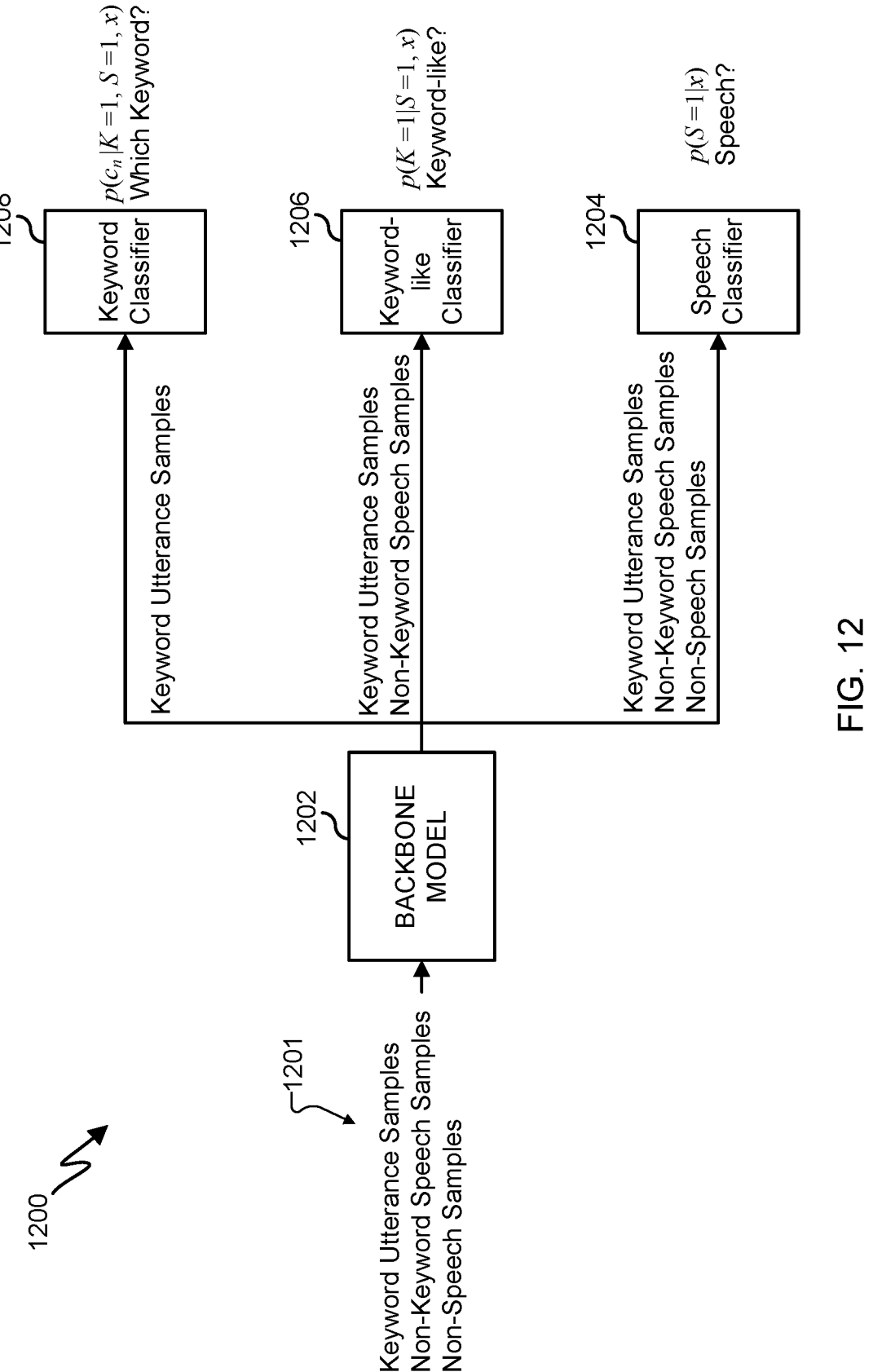
FIG. 12 illustrates an example keyword detection model training process in accordance with this disclosure.

FIG. 12 illustrates an example keyword detection model training process 1200 in accordance with this disclosure. For ease of explanation, the process 1200 shown in FIG. 12 is described as being performed using the server 106 in the network configuration 100 of FIG. 1. As a particular example, the process 1200 can be executed on the server 106 in the network configuration 100 of FIG. 1, and trained machine learning models (such as a trained keyword detection model 202) can be deployed to a client electronic device 101 for use. However, the process 1200 may be used with any other suitable device(s), such as the electronic device 101, and in any other suitable system(s).

Figure 13:
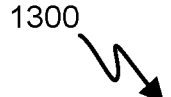
FIG. 13 illustrates an example table showing label categories for training data in accordance with this disclosure.

As shown in FIG. 12, the process 1200 is a multi-label training process in which multiple labels are assigned to each data sample to indicate the various subgroups to which the data sample simultaneously belongs. For example, FIG. 13 illustrates an example table 1300 showing label categories for training data in accordance with this disclosure. As shown in FIG. 13, training samples that are non-speech training samples have a "non-speech" label assigned to them. Generic speech (non-keyword speech) training samples have both "speech" and "not keyword-like" labels assigned to them. Finally, keyword training samples have all of "keyword label index" (that is, an indication of a specific keyword included in the audio sample), "keyword-like," and "speech" labels assigned to them. Based on the labels, the processor can cause data to be pooled to create subgroups of training data using the natural hierarchical structure present in audio data. The use of multiple labels provides a richer learning signal during training and informs the model that a keyword should meet multiple criteria. During training, the keyword detection model is trained to predict all the assigned labels for each data sample. Thus, for the model to declare the presence of a keyword, the input audio signal should be assigned correct labels in all categories (that is, detection of all three classes for keyword classification), thus reducing the possibility of false alarms in the trained and deployed models. Since the labels are based on inherent properties of audio signals, they can be dataset independent, which assists with generalization of out-of-domain data during deployment. Prior approaches that only assign a single label to each data sample cause models to be prone to errors, especially for out-of-domain data. Additionally, these labels used for multi-labeling can already be found in keyword detection datasets, and thus do not require additional labeling efforts.

Referring again to FIG. 12, a plurality of training samples 1201 are obtained and provided to a backbone model 1202. As described above, the plurality of training samples 1201 include keyword utterance samples having three labels, non-keyword speech samples having two labels, and non-speech samples having one label, as shown and described with respect to FIG. 13. The backbone model 1202 processes the audio data samples 1201 and all embeddings corresponding to the data samples are passed through an untrained speech classifier 1204 to be classified as speech or non-speech. All embeddings corresponding to the data samples including speech (the non-keyword speech samples and the keyword utterance samples) are passed through the untrained keyword-like classifier 1206 to be classified into keyword-like or non-keyword-like categories. Then, embeddings corresponding to the keyword utterances are passed through the untrained keyword classifier 1208 to classify the keyword utterances into individual keyword classes. To train the models, the outputs of the three branches can be used to compute three separate losses: a softmax loss for the keyword classifier, and weighted focal loss for binary classification at the keyword-like classifier and speech classifier. The final loss function can be represented as follows:

$$\mathcal{L} = \mathcal{L}_{softmax} + \lambda_1 \mathcal{L}_{keyword\ branch} + \lambda_2 \mathcal{L}_{speech\ branch} \qquad (3)$$

In this example, the data samples go through multiple filtering stages before being identified as keywords, leading to low false alarm rates. In various embodiments, during inferencing using the trained models it is not known a priori whether a given audio input is speech, keyword-like, or a keyword. The audio input is thus passed through all three branches and the successive refinement inference operation is used to categorize the audio input. Existing systems simply treat the different categories of audio data (non-speech, generic speech, keywords) as belonging to different classes. Therefore, training these systems requires partitioning a given dataset into these categories, resulting in a reduced number of examples for each category. As illustrated in FIG. 12, the training process 1200 follows a different approach by training the model to solve three different tasks. In the first task, the model is trained via the speech classifier 1204 to distinguish between speech audio and non-speech audio. To do so, the keyword speech and non-keyword speech samples are pooled into one class, resulting in many examples for the speech class. This results in a more robust speech classifier. Similarly, the model is trained via the keyword-like classifier 1206 by pooling all the keywords into the "keyword-like" class. Training these different classifiers with pooled data results in better generalization. When these classifiers are used in conjunction to detect keywords during inference, they achieve lower false alarm rates, as also illustrated by the diagrams 505, 507, 509 illustrated in FIG. 5.

Although FIG. 12 illustrates one example of a keyword detection model training process 1200, various changes may be made to FIG. 12. For example, while shown as a series of steps, various steps in FIG. 12 could overlap, occur in parallel, occur in a different order, or occur any number of times. As a particular example, labeled training samples may be provided any number of times depending on the loss measured during successive training steps. Using the output probabilities from each classifier, the loss function can be used to determine, based on the ground truth labels of the training data samples, an error or loss. The error or loss can be used to modify or update parameters of one or more of the classifiers. For example, when the output of one or more of the classifier models differ from the ground truths, the difference can be used to calculate the loss as defined by the loss function. Based on the calculated loss, parameters of the classifier models can be adjusted.

If it is determined the training of one or more of the classifier models is not complete, such as determining that one or more of the classifier models is outputting predictions using the input training data at a less than acceptable accuracy level, the process 1200 can continue training using the same or additional training audio samples. The process 1200 can include any number of training sessions to obtain additional outputs from the classifiers that are compared to the ground truths so that additional losses can be determined using the loss function. Over time, the classifier models produce more accurate outputs that more closely match the ground truths, and the measured loss becomes less. The amount of training data used can vary depending on the number of training cycles and may include large amounts of training data. At some point, the measured loss can drop below a specified threshold, and it can be that the desired accuracy is achieved. If it is determined the training of one or more of the classifier models is complete, such as by determining whether one or more of the classifier models is outputting predictions using the input training data at an acceptable accuracy level, the training can be concluded and the keyword detection model deployed, such as on electronic device 101.

Figure 14:
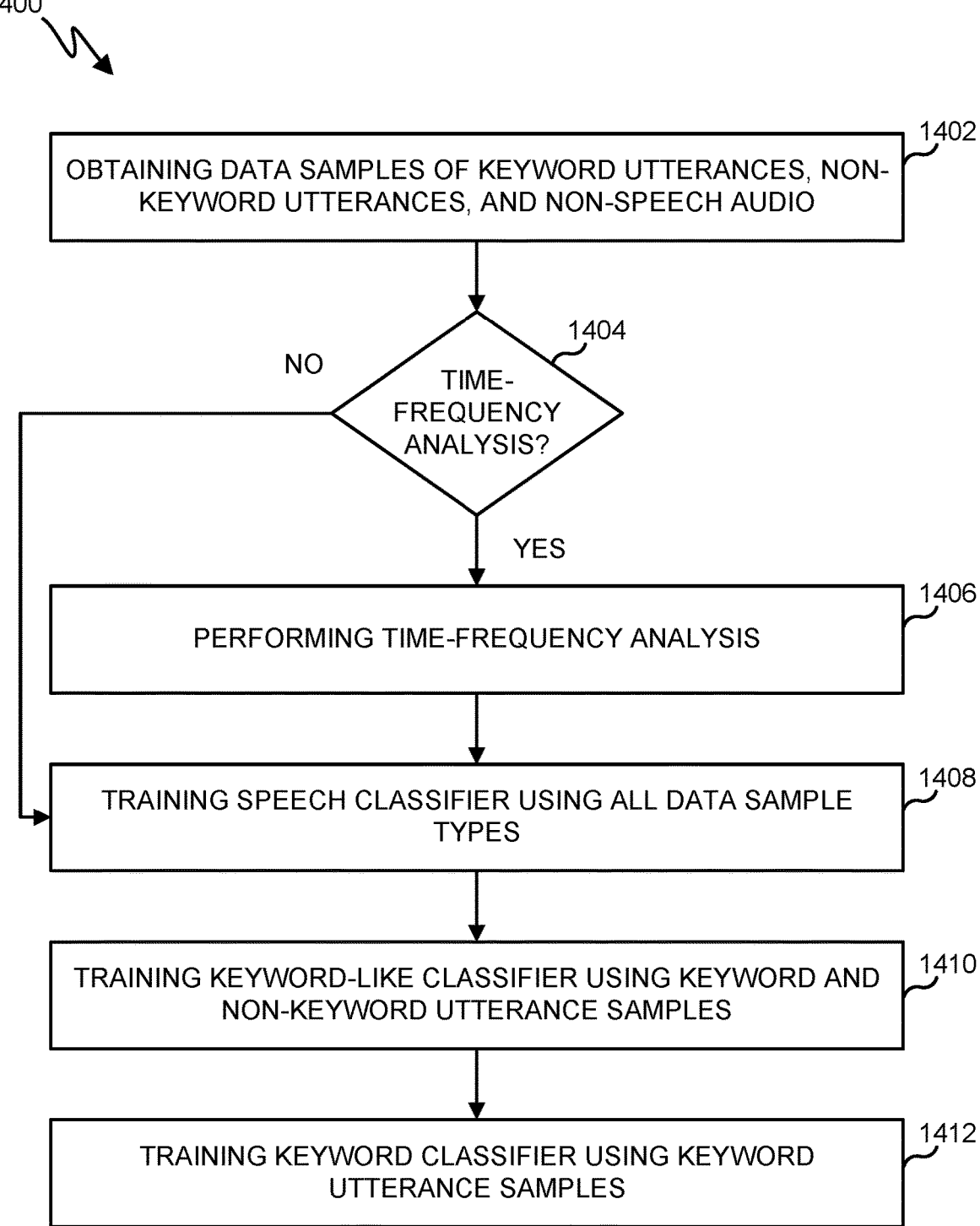
FIG. 14 illustrates an example method for training a keyword detection model in accordance with this disclosure.

FIG. 14 illustrates an example method 1400 for training a keyword detection model in accordance with this disclosure. For ease of explanation, the method 1400 shown in FIG. 14 is described as being performed using the server 106 in the network configuration 100 of FIG. 1. As a particular example, the method 1400 can be executed on the server 106 in the network configuration 100 of FIG. 1, and trained machine learning models (such as a trained keyword detection model 202) can be deployed to a client electronic device 101 for use. However, the method 1400 may be used with any other suitable device(s), such as the electronic device 101, and in any other suitable system(s).

At block 1402, data samples of keyword utterances, non-keyword speech, and non-speech audio are obtained for training purposes. If some cases, background noise can also be collected for data augmentation. At decision block 1404, it is determined whether to perform time-frequency analysis on the training data. If not, the method 1400 moves to block 1408. If so, at block 1406, the processor causes time domain data to be converted into Time-Frequency (TF) domain to extract useful features using methods like short-time Fourier transform (STFT), MelSpectrogram, and/or Mel Frequency Cepstral Coefficient (MFCC) methods.

At block 1408, the processor causes the speech classifier to be trained using all data sample types, that is, keyword utterance samples, non-keyword speech samples, and non-speech samples. At block 1410, the processor causes the keyword-like classifier to be trained using the keyword utterance samples and the non-keyword speech samples. At block 1412, the processor causes the keyword classifier to be trained using the keyword utterance samples, as also described with respect to FIGS. 12 and 13.

Although FIG. 14 illustrates one example of a method 1400 for training a keyword detection model, various changes may be made to FIG. 14. For example, while shown as a series of steps, various steps in FIG. 14 could overlap, occur in parallel, occur in a different order, or occur any number of times. As a particular example, various data augmentation mechanisms like dynamic noise addition (such as using background recorded noise, or generated noise like white noise, pink noise, brown noise, etc.) with varying signal to noise ratios, time-shifting, and spectral masking (if operating in the TF domain) can also be employed during training. Additionally, labeled training samples may be provided any number of times depending on the loss measured during successive training steps. Using the output probabilities from each classifier, a loss function can be used to determine, based on the ground truth labels of the training data samples, an error or loss. The error or loss can be used to modify or update parameters of one or more of the classifiers. For example, when the output of one or more of the classifier models differ from the ground truths, the difference can be used to calculate a loss as defined by the loss function. The loss function may use any suitable measure of loss associated with outputs generated by the classifiers, such as a cross-entropy loss or a mean-squared error. Based on the calculated loss, parameters of the classifier models can be adjusted.

If it is determined the training of one or more of the classifier models is not complete, such as determining that one or more of the classifier models is outputting predictions using the input training data at a less than acceptable accuracy level, the method 1400 can continue training using the same or additional training audio samples. The method 1400 can include any number of training sessions to obtain additional outputs from the classifiers that are compared to the ground truths so that additional losses can be determined using the loss function. Over time, the classifier models produce more accurate outputs that more closely match the ground truths, and the measured loss becomes less. The amount of training data used can vary depending on the number of training cycles and may include large amounts of training data. At some point, the measured loss can drop below a specified threshold, and it can be that the desired accuracy is achieved. If it is determined the training of one or more of the classifier models is complete, such as by determining whether one or more of the classifier models is outputting predictions using the input training data at an acceptable accuracy level, the training can be concluded and the keyword detection model deployed, such as on electronic device 101.

FIG. 15 illustrates an example method 1500 for performing keyword detection in accordance with this disclosure. For ease of explanation, the method 1500 shown in FIG. 15 is described as being performed using the electronic device 101 in the network configuration 100 of FIG. 1. However, the method 1500 could be performed using any other suitable device(s), such as the server 106, and in any other suitable system(s).

At block 1502, the processor obtains an audio input from an input device such as one or more microphones. At decision block 1504, the processor determines whether to perform time-frequency analysis on the input data. In various embodiments, the processor determines whether to perform time-frequency analysis based on whether time-frequency analysis was performed during the training phase. If not, the method 1500 moves to block 1508. If so, at block 1506, the processor performs time-frequency analysis. As described in this disclosure, the keyword detection model can include a backbone model, and the audio input can be processed through the backbone model initially.

At block 1508, the processor, using the keyword detection model, computes outputs from the speech classifier (such as speech classifier 604), the keyword-like classifier (such as keyword-like classifier 606), and the keyword classifier (such as keyword classifier 608) of the keyword detection model. At block 1510, the processor combines the output probabilities obtained from the three classifiers, such as via an inference combination operation like the inference combination operation 610 or 710. At decision block 1512, the processor determines whether a keyword was detected based on the output of the combination of the output classifier probabilities performed at block 1510. If not, the method 1500 ends at block 1516. If so, at block 1514, the processor causes an output signal to be emitted corresponding to the detected keyword for further processing by the target device. Based on the detected keyword, further ASR/NLU processing may be performed on the utterance to determine whether the utterance includes a device command, such as commands like calling a contact, playing music, changing a setting in an IoT device, etc. The method 1500 then ends at block 1516.

Although FIG. 15 illustrates one example of a method 1500 for performing keyword detection, various changes may be made to FIG. 15. For example, while shown as a series of steps, various steps in FIG. 15 could overlap, occur in parallel, occur in a different order, or occur any number of times. As a particular example, the method 1500 may also be performed using a distributed architecture. For instance, the keyword detection model 202 can be executed on a client electronic device (such as electronic device 101) or at a server (such as server 106). In various embodiments, additional ASR/NLU model(s) can also be executed by the electronic device or by the server. When executed by the server, the server may provide the client electronic device with the determined action(s) to be performed by the client electronic device. In some embodiments, the client electronic device can provide audio data received via an audio input device of the client electronic device to the server, and the keyword detection model, and other models such as ASR/NLU model(s), can be executed by the server based on the audio data provided from the client electronic device.

FIG. 16 illustrates another example method 1600 for performing keyword detection in accordance with this disclosure. For ease of explanation, the method 1600 shown in FIG. 16 is described as being performed using the electronic device 101 in the network configuration 100 of FIG. 1. However, the method 1600 could be performed using any other suitable device(s), such as the server 106, and in any other suitable system(s).

At block 1602, audio data is obtained from an audio input device. This can include the processor controlling one or more audio input devices, such as microphones of the electronic device, to record audio data and store, at least temporarily, the audio data in memory or other storage. At block 1604, the audio data is provided as input to a keyword detection model. This can include the processor retrieving or otherwise controlling communication of the audio data to the keyword detection model stored on the electronic device. At block 1606, audio features are extracted, using the keyword detection model, from the audio data. This can include the processor executing one or more layers of the keyword detection model to extract audio features such as energy levels or other features from the input audio data. As described in this disclosure, this can include extracting the audio features using a backbone model (such as backbone model 602) of the keyword detection model.

At block 1608, the audio features are processed by a first layer of the keyword detection model (such as a speech classifier like the speech classifier 604) configured to predict a first likelihood that the audio data includes speech. This can include the processor executing the first layer to obtain the probability of whether the audio data includes speech or not. At block 1610, the audio features are processed by a second layer of the keyword detection model (such as a keyword-like speech classifier such as the keyword-like classifier 606) configured to predict a second likelihood that the audio data includes keyword-like speech. This can include the processor executing the second layer to obtain the probability of whether the audio data includes keyword-like speech or not.

At block 1612, the audio features are processed by a third layer (such as a keyword classifier like the keyword classifier 608) configured to predict a third likelihood, for each of a plurality of possible keywords, that the audio data includes the keyword. This can include the processor executing the third layer to obtain one or more probabilities of whether the audio data includes one or more keywords. It will be understood that, although the layers of the keyword detection model are enumerated here as "first," "second," and "third," the layers may not be the actual first, second, and third layers of the keyword detection model. Rather, as described in this disclosure, the layers may be among the final classification layers of the keyword detection model, with proceeding layers processing the audio input such as to extract the audio features from the audio input.

At block 1614, a keyword included in the audio data is identified. This can include the processor executing an operation (such as the inference combinations operation 610 or 710) to determine a keyword with a highest output probability. At block 1616, instructions are generated to perform an action based at least in part on the identified keyword. This can include the processor, based on the identified keyword, causing the electronic device to perform additional actions, such as performing further ASR/NLU processing on the utterance to determine whether the utterance includes a device command, such as commands like calling a contact, playing music, changing a setting in an IoT device, etc.

In some embodiments, processing the audio features by the second layer of the keyword detection model is performed in response to the first likelihood exceeding a first threshold, processing the audio features by the third layer of the keyword detection model is performed in response to the second likelihood exceeding a second threshold, and identifying the keyword includes identifying which one of the plurality of possible keywords is associated with a highest third likelihood. For example, as described with respect to FIG. 6, thresholds for the first and second layers can be used. In some embodiments, identifying the keyword includes determining, based on the first likelihood, the second likelihood, and each of the third likelihood, that the audio data includes the keyword. For example, as described with respect to FIG. 7, a maximum probability for all N+2 possibilities can be determined using the outputs provided by each of the first, second, and third layers.

As described in this disclosure, the keyword detection model can be trained using a training dataset that includes a first set of audio data samples including non-speech audio, a second set of audio data samples including non-keyword speech, and a third set of audio data samples including a keyword. Each audio data sample can be annotated with a speech label indicating whether the audio data sample includes speech, a keyword-like label indicating whether the audio data sample includes keyword-like speech, and a keyword label identifying which keyword, if any, is in the audio data sample. As also described in this disclosure, the first layer of the keyword detection model can be trained using the first set of audio data samples, the second set of audio data samples, and the third set of audio data samples to distinguish between speech and non-speech audio, where the audio data samples including non-keyword speech and the audio data samples including a keyword are pooled into a speech class. As also described in this disclosure, the second layer of the keyword detection model can be trained using the second set of audio data samples and the third set of audio data samples to distinguish between non-keyword and keyword-like speech, where the audio data samples including keyword-like speech are pooled into a keyword-like class. As also described in this disclosure, the third layer of the keyword detection model can be trained using the third set of audio data samples.

Although FIG. 16 illustrates one example of a method 1600 for performing keyword detection, various changes may be made to FIG. 16. For example, while shown as a series of steps, various steps in FIG. 16 could overlap, occur in parallel, occur in a different order, or occur any number of times. As a particular example, if the probabilities output by the first, second, and third layers indicate that the audio data includes non-speech or non-keyword-like speech, the method 1600 may end prior to block 1614. Additionally, the method 1600 may also be performed using a distributed architecture. For instance, the keyword detection model 202 can be executed on a client electronic device (such as electronic device 101) or at a server (such as server 106). In various embodiments, additional ASR/NLU model(s) can also be executed by the electronic device or by the server. When executed by the server, the server may provide the client electronic device with the determined action(s) to be performed by the client electronic device. In some embodiments, the client electronic device can provide audio data received via an audio input device of the client electronic device to the server, and the keyword detection model, and other models such as ASR/NLU model(s), can be executed by the server based on the audio data provided from the client electronic device.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

obtaining audio data from an audio input device;

providing the audio data as input to a keyword detection model;

extracting, using the keyword detection model, audio features from the audio data;

processing the audio features by a first layer of the keyword detection model configured to predict a first likelihood that the audio data includes speech;

processing the audio features by a second layer of the keyword detection model configured to predict a second likelihood that the audio data includes keyword-like speech;

processing the audio features by a third layer of the keyword detection model configured to predict a third likelihood, for each of a plurality of possible keywords, that the audio data includes the keyword;

providing each of the first likelihood, the second likelihood, and the third likelihood to an inference combination layer of the keyword detection model;

identifying a keyword included in the audio data based on a combination of the first likelihood, the second likelihood, and the third likelihood by the inference combination layer; and generating instructions to perform an action based at least in part on the identified keyword.

2. The method of claim 1, further comprising:

processing the audio features by the second layer of the keyword detection model in response to the first likelihood exceeding a first threshold; and processing the audio features by the third layer of the keyword detection model in response to the second likelihood exceeding a second threshold, wherein identifying the keyword includes identifying which one of the plurality of possible keywords is associated with a highest third likelihood.

3. The method of claim 1, wherein identifying the keyword includes determining, based on the first likelihood, the second likelihood, and each of the third likelihood, that the audio data includes the keyword.

4. The method of claim 1, wherein the audio features are extracted from the audio data using a backbone model of the keyword detection model.

5. The method of claim 1, wherein the keyword detection model is trained using a training dataset that includes a first set of audio data samples including non-speech audio, a second set of audio data samples including non-keyword speech, and a third set of audio data samples including a keyword, and wherein each audio data sample is annotated with a speech label indicating whether the audio data sample includes speech, a keyword-like label indicating whether the audio data sample includes keyword-like speech, and a keyword label identifying which keyword, if any, is in the audio data sample.

6. The method of claim 5, wherein the first layer of the keyword detection model is trained using the first set of audio data samples, the second set of audio data samples, and the third set of audio data samples to distinguish between speech and non-speech audio, wherein the audio data samples including non-keyword speech and the audio data samples including a keyword are pooled into a speech class.

7. The method of claim 5, wherein the second layer of the keyword detection model is trained using the second set of audio data samples and the third set of audio data samples to distinguish between non-keyword and keyword-like speech, wherein the audio data samples including keyword-like speech are pooled into a keyword-like class.

8. The method of claim 5, wherein the third layer of the keyword detection model is trained using the third set of audio data samples.

9. An electronic device comprising:

at least one processing device configured to:

obtain audio data from an audio input device;

provide the audio data as input to a keyword detection model;

extract, using the keyword detection model, audio features from the audio data;

process the audio features by a first layer of the keyword detection model configured to predict a first likelihood that the audio data includes speech;

process the audio features by a second layer of the keyword detection model configured to predict a second likelihood that the audio data includes keyword-like speech;

process the audio features by a third layer of the keyword detection model configured to predict a third likelihood, for each of a plurality of possible keywords, that the audio data includes the keyword;

provide each of the first likelihood, the second likelihood, and the third likelihood to an inference combination layer of the keyword detection model;

identify a keyword included in the audio data based on a combination of the first likelihood, the second likelihood, and the third likelihood by the inference combination layer; and generate instructions to perform an action based at least in part on the identified keyword.

10. The electronic device of claim 9, wherein the at least one processing device is further configured to:

process the audio features by the second layer of the keyword detection model in response to the first likelihood exceeding a first threshold; and process the audio features by the third layer of the keyword detection model in response to the second likelihood exceeding a second threshold, wherein, to identify the keyword, the at least one processing device is further configured to identify which one of the plurality of possible keywords is associated with a highest third likelihood.

11. The electronic device of claim 9, wherein, to identify the keyword, the at least one processing device is further configured to determine, based on the first likelihood, the second likelihood, and each of the third likelihood, that the audio data includes the keyword.

12. The electronic device of claim 9, wherein the audio features are extracted from the audio data using a backbone model of the keyword detection model.

13. The electronic device of claim 9, wherein the keyword detection model is trained using a training dataset that includes a first set of audio data samples including non-speech audio, a second set of audio data samples including non-keyword speech, and a third set of audio data samples including a keyword, and wherein each audio data sample is annotated with a speech label indicating whether the audio data sample includes speech, a keyword-like label indicating whether the audio data sample includes keyword-like speech, and a keyword label identifying which keyword, if any, is in the audio data sample.

14. The electronic device of claim 13, wherein the first layer of the keyword detection model is trained using the first set of audio data samples, the second set of audio data samples, and the third set of audio data samples to distinguish between speech and non-speech audio, wherein the audio data samples including non-keyword speech and the audio data samples including a keyword are pooled into a speech class.

15. The electronic device of claim 13, wherein the second layer of the keyword detection model is trained using the second set of audio data samples and the third set of audio data samples to distinguish between non-keyword and keyword-like speech, wherein the audio data samples including keyword-like speech are pooled into a keyword-like class.

16. The electronic device of claim 13, wherein the third layer of the keyword detection model is trained using the third set of audio data samples.

17. A non-transitory machine readable medium containing instructions that when executed cause at least one processor of an electronic device to:

obtain audio data from an audio input device;

provide the audio data as input to a keyword detection model;

extract, using the keyword detection model, audio features from the audio data;

process the audio features by a first layer of the keyword detection model configured to predict a first likelihood that the audio data includes speech;

process the audio features by a second layer of the keyword detection model configured to predict a second likelihood that the audio data includes keyword-like speech;

process the audio features by a third layer of the keyword detection model configured to predict a third likelihood, for each of a plurality of possible keywords, that the audio data includes the keyword;

provide each of the first likelihood, the second likelihood, and the third likelihood to an inference combination layer of the keyword detection model;

identify a keyword included in the audio data based on a combination of the first likelihood, the second likelihood, and the third likelihood by the inference combination layer, and generate instructions to perform an action based at least in part on the identified keyword.

18. The non-transitory machine readable medium of claim 17, further comprising instructions that when executed cause the at least one processor to:

process the audio features by the second layer of the keyword detection model in response to the first likelihood exceeding a first threshold; and process the audio features by the third layer of the keyword detection model in response to the second likelihood exceeding a second threshold, wherein, to identify the keyword, the instructions when executed further cause the at least one processor to identify which one of the plurality of possible keywords is associated with a highest third likelihood.

19. The non-transitory machine readable medium of claim 17, wherein to identify the keyword, the instructions when executed further cause the at least one processor to determine, based on the first likelihood, the second likelihood, and each of the third likelihood, that the audio data includes the keyword.

20. The non-transitory machine readable medium of claim 17, wherein:

the keyword detection model is trained using a training dataset that includes a first set of audio data samples including non-speech audio, a second set of audio data samples including non-keyword speech, and a third set of audio data samples including a keyword;

each audio data sample is annotated with a speech label indicating whether the audio data sample includes speech, a keyword-like label indicating whether the audio data sample includes keyword-like speech, and a keyword label identifying which keyword, if any, is in the audio data sample;

the first layer of the keyword detection model is trained using the first set of audio data samples, the second set of audio data samples, and the third set of audio data samples to distinguish between speech and non-speech audio, wherein the audio data samples including non-keyword speech and the audio data samples including a keyword are pooled into a speech class;

the second layer of the keyword detection model is trained using the second set of audio data samples and the third set of audio data samples to distinguish between non-keyword and keyword-like speech, wherein the audio data samples including keyword-like speech are pooled into a keyword-like class; and the third layer of the keyword detection model is trained using the third set of audio data samples.

* * * * *